US012302390B2

(12) United States Patent
Lou et al.

(10) Patent No.: US 12,302,390 B2
(45) Date of Patent: *May 13, 2025

(54) MULTI-BAND OPERATION FOR WIRELESS LAN SYSTEMS

(71) Applicant: InterDigital Patent Holdings, Inc., Wilmington, DE (US)

(72) Inventors: Hanqing Lou, Syosset, NY (US); Monisha Ghosh, Chicago, IL (US); Xiaofei Wang, Cedar Grove, NJ (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,478

(22) Filed: Jun. 10, 2019

(65) Prior Publication Data

US 2019/0297646 A1    Sep. 26, 2019

Related U.S. Application Data

(63) Continuation of application No. 14/777,151, filed as application No. PCT/US2014/026720 on Mar. 13, 2014, now Pat. No. 10,321,484.

(Continued)

(51) Int. Cl.
*H04W 74/0816* (2024.01)
*H04B 7/06* (2006.01)
(Continued)

(52) U.S. Cl.
CPC ...... *H04W 74/0816* (2013.01); *H04B 7/0617* (2013.01); *H04W 72/21* (2023.01);
(Continued)

(58) Field of Classification Search
CPC ... H04W 76/02; H04W 76/025; H04W 76/04; H04W 88/02; H04W 88/08; H04W 4/20;
(Continued)

(56) References Cited

U.S. PATENT DOCUMENTS

| 7,050,452 B2 * | 5/2006 | Sugar | H04W 16/14 |
| | | | 370/208 |
| 7,382,758 B2 * | 6/2008 | Silverman | H04W 74/04 |
| | | | 370/338 |

(Continued)

FOREIGN PATENT DOCUMENTS

| CN | 102138356 | 7/2011 |
| CN | 102238681 | 11/2011 |

(Continued)

OTHER PUBLICATIONS

Chen et al., "A Simplified Method for Beamforming Training Procedure for Multi-Band Capable MM-Wave Device," 5 pages (Jan. 23, 2013).

(Continued)

*Primary Examiner* — Jason E Mattis
(74) *Attorney, Agent, or Firm* — Volpe Koenig

(57) ABSTRACT

Systems, methods, and instrumentalities are provided to implement transmission scheduling. A multiband device may send a request via a first frequency band. The request may include a multiband Request to Send (MRTS) transmission. The request may be associated with a second frequency band and/or a beamforming training schedule. The first frequency band may be associated with a quasi-omni transmission and the second frequency band may be associated with a directional transmission. The first frequency band may be a 5 GHz band and the second frequency band may be a 60 GHz band. The multiband device may receive a multiband Clear to Send (MCTS) transmission via the first frequency band confirming the request. The multi- (Continued)

band device may be configured to send a beamforming signal in accordance with the request, for example, via the second frequency band. The beamforming signal may be sent in accordance with a beamforming training schedule.

20 Claims, 13 Drawing Sheets

Related U.S. Application Data

(60) Provisional application No. 61/788,556, filed on Mar. 15, 2013.

(51) Int. Cl.
*H04W 72/21* (2023.01)
*H04W 84/12* (2009.01)
*H04W 88/06* (2009.01)
*H04W 88/08* (2009.01)

(52) U.S. Cl.
CPC ............ *H04W 84/12* (2013.01); *H04W 88/06* (2013.01); *H04W 88/08* (2013.01)

(58) Field of Classification Search
CPC . H04W 28/12; H04W 72/04; H04W 72/0446; H04W 72/1263; H04W 74/0816
USPC .......................... 370/310, 338, 339, 349, 465
See application file for complete search history.

(56) References Cited

U.S. PATENT DOCUMENTS

| | | | | |
|---|---|---|---|---|
| 7,710,929 B2* | 5/2010 | Moreton | ............... | H04W 74/02 370/338 |
| 8,125,952 B2* | 2/2012 | Sampath | ............... | H04W 74/02 370/330 |
| 8,134,503 B2* | 3/2012 | Na | ........................ | H04B 7/0697 342/370 |
| 8,175,532 B2* | 5/2012 | Nanda | .................... | H04B 15/00 455/63.4 |
| 8,255,714 B2 | 8/2012 | Singh et al. | | |
| 8,274,903 B2 | 9/2012 | Wentink et al. | | |
| 8,289,940 B2 | 10/2012 | Singh et al. | | |
| 8,422,961 B2 | 4/2013 | Kafle | | |
| 8,706,124 B2* | 4/2014 | Kakani | .................. | H04L 1/0022 455/450 |
| 8,743,838 B2* | 6/2014 | Gong | ................... | H04B 7/0617 370/334 |
| 8,767,683 B2* | 7/2014 | Liu | .................... | H04W 72/0446 370/336 |
| 8,811,310 B2 | 8/2014 | Fontaine et al. | | |
| 8,811,420 B2 | 8/2014 | Singh et al. | | |
| 8,843,076 B2* | 9/2014 | Trainin | .................. | H04L 1/1829 455/67.11 |
| 8,873,526 B2* | 10/2014 | Shaffer | ............... | H04W 28/044 370/338 |
| 8,885,621 B2 | 11/2014 | Cordeiro | | |
| 9,219,576 B2* | 12/2015 | Zhang | ................... | H04W 16/28 |
| 9,370,002 B2* | 6/2016 | Liu | ................... | H04W 72/0446 |
| 9,401,753 B2 | 7/2016 | Cordeiro | | |
| 9,935,785 B2* | 4/2018 | Aggarwal | ............... | H04L 1/188 |
| 10,270,515 B2 | 4/2019 | Lee et al. | | |
| 2006/0050742 A1 | 3/2006 | Grandhi et al. | | |
| 2006/0223574 A1 | 10/2006 | Chandra | | |
| 2008/0130519 A1* | 6/2008 | Bahl | ...................... | H04W 16/14 370/254 |
| 2008/0248768 A1* | 10/2008 | Doi | ................... | H04W 52/0245 455/127.5 |
| 2009/0196180 A1* | 8/2009 | Bahl | ...................... | H04L 5/0032 370/252 |
| 2009/0323847 A1 | 12/2009 | Na et al. | | |
| 2010/0046455 A1 | 2/2010 | Wentink et al. | | |
| 2010/0135238 A1 | 6/2010 | Sadri et al. | | |
| 2010/0172296 A1 | 7/2010 | Singh et al. | | |
| 2010/0214169 A1 | 8/2010 | Kafle et al. | | |
| 2010/0315954 A1 | 12/2010 | Singh et al. | | |
| 2011/0065440 A1 | 3/2011 | Kakani | | |
| 2011/0194644 A1* | 8/2011 | Liu | ........................ | H04L 5/0023 375/295 |
| 2011/0261735 A1 | 10/2011 | Cordeiro | | |
| 2012/0020312 A1* | 1/2012 | Lv | ........................ | H04L 1/1887 370/329 |
| 2012/0314614 A1 | 12/2012 | Wentink et al. | | |
| 2013/0044695 A1 | 2/2013 | Xu et al. | | |
| 2013/0089000 A1 | 4/2013 | Hansen et al. | | |
| 2014/0119316 A1* | 5/2014 | Linden | .................. | H04L 5/0064 370/329 |
| 2015/0016333 A1 | 1/2015 | Lee et al. | | |
| 2016/0205615 A1* | 7/2016 | Seok | ..................... | H04W 48/16 370/338 |

FOREIGN PATENT DOCUMENTS

| | | |
|---|---|---|
| CN | 102577580 | 7/2012 |
| EP | 2 528 402 | 11/2012 |
| WO | 2011/000391 | 6/2011 |

OTHER PUBLICATIONS

Chen et al., "MAC and PHY Proposal for 802.11af," IEEE 802.11-10/0258r0, 23 pages (Mar. 2010).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHZ, IEEE P802.11ac/D1.0 (May 2011).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D2.0 (Jul. 2012).

Halasz, "Sub 1 GHz license-exempt PAR and 5C," IEEE 802.11-10/0001r13 (Jul. 2010).

Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad/D8.0 (May 2012).

IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information technology—Telecommunications and information exchange between systems —Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-REVmb/D12 (Nov. 2011).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 10: Mesh Networking, IEEE Std. 802.11s-2011 (Sep. 2011).

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 7: Fast Initial Link Setup, IEEE P802.11ai/D0.4 (Jan. 2013).

Park et al., "Band Adjustment (Between 2.4 GHz and 5GHZ) for AP Discvoery," IEEE 802.11-12/1042, 15 pages (Sep. 6, 2012).

Shan, "CCF Works with PSM and MDA," IEEE 802.11-06/1420r2, IEEE P802.11 Wireless LANs, pp. 1-5 (Sep. 19, 2006).

IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Murray et al., An Analysis of Handoff in Multi-band 802.11 Networks, 2007 IEEE International Conference on Mobile Adhoc and Sensor Systems (Jan. 14, 2008).

\* cited by examiner

MULTI-BAND OPERATION FOR WIRELESS LAN SYSTEMS

CROSS-REFERENCE TO RELATED APPLICATIONS

This application is continuation of U.S. application Ser. No. 14/777,151 filed on Sep. 15, 2015 which claims the benefit of PCT/US14/26720, filed Mar. 13, 2014, which claims the benefit of U.S. Provisional Application No. 61/788,556, filed Mar. 15, 2013, the contents of which are hereby incorporated by reference herein.

BACKGROUND

With increasing demand for higher bandwidths in wireless local area networks (WLANs), advances in WLAN may support devices with multiple frequency channels, channel bandwidths, etc. Devices with multiple wireless frequency bands may provide different but complementary characteristics in terms of coverage range and throughput. However, existing multi-band operation techniques may be inefficient.

SUMMARY

Systems, methods, and instrumentalities are provided to implement transmission scheduling. A multiband device may send a request via a first frequency band. The request may be associated with a second frequency band. The request may include a multiband Request to Send (MRTS) transmission. The request may be for a transmit opportunity (TxOP) reservation for the second frequency band. The request (e.g., the MRTS) may be associated with a beamforming schedule (e.g., a beamforming training schedule and/or a beamforming transmission schedule). The first frequency band may be associated with an omni transmission (e.g., a quasi-omni transmission) and the second frequency band may be associated with a directional transmission (e.g., a beamformed transmission). The first frequency band may be a 5 GHz band and the second frequency band may be a 60 GHz band.

The multiband device may receive a multiband Clear to Send (MCTS) transmission via the first frequency band. The MCTS may indicate acceptance of the request. The MCTS transmission may include a field that indicates whether the request (e.g., a request for a TxOP reservation, a request to send a beamforming transmission, such as a beamforming training transmission or other beamforming transmission, and/or the like) is confirmed. The MRTS and/or MCTS transmissions may include one or more of the following: a schedule field, a multiband control field, a band identification (ID) field, a channel ID field, a band service set identification (BSSID) field, a station media access control (MAC) address field, and/or the like.

The multiband device may send a beamforming signal in accordance with the request (e.g., the TxOP reservation). The beamforming signal may be a beamforming training signal, a beamforming transmission signal, and/or the like. The beamforming signal may be transmitted via the second frequency band. The beamforming signal may be part of a sequence of beamforming signals. The multiband device may be configured to transmit the beamforming signal to a region associated with a device that sent the MCTS transmission.

The multiband device may receive a beamforming schedule (e.g., a beamforming training schedule and/or a beamforming transmission schedule). The beamforming schedule may be received via an Access Point (AP). The multiband device may be configured to transmit one or more Sector Sweep (SSW) frames via the second frequency band. The one or more SSW frames may be part of the beamforming schedule. A SSW frame (e.g., or more) of the one or more SSW frames may not include a MAC body. A SSW frame may include information relating to one or more antenna sectors (e.g., the best antenna sectors) for the beamforming schedule.

DETAILED DESCRIPTION

Figure 1:
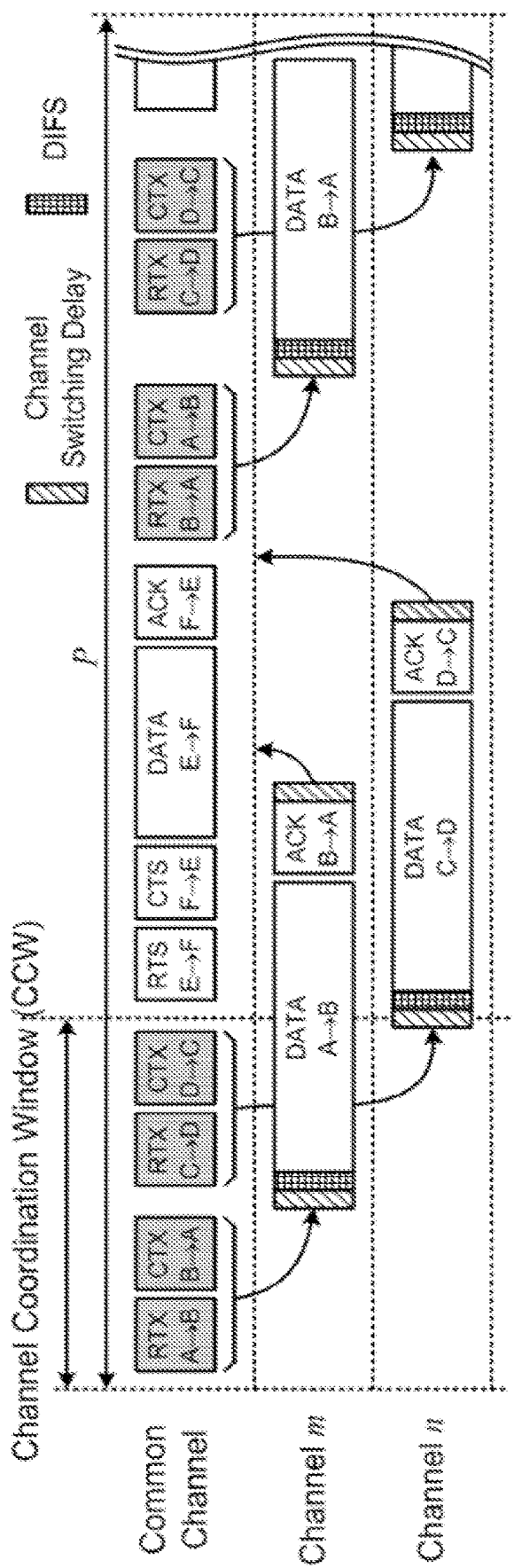
FIG. 1 is a diagram of an example of a channel coordination mechanism.

A detailed description of illustrative embodiments will now be described with reference to the various figures. Although this description provides a detailed example of possible implementations, it should be noted that the details are intended to be exemplary and in no way limit the scope of the application.

A WLAN in infrastructure basic service set (BSS) mode may include an access point (AP) for the basic service set (BSS) and one or more stations (STAs) associated with the AP. The AP may include an access and/or an interface to a Distribution System (DS). The AP may include a type of wired/wireless network that may carry traffic in and/or out of the BSS. Traffic to the STAs may originate from outside the BSS, may arrive through the AP, and/or may be delivered to the STAs. The traffic originating from the STAs directed to destinations outside the BSS may be sent to the AP to be delivered to the respective destinations. Traffic between STAs within the BSS may be sent through the AP. A source STA may send traffic to the AP. The AP may deliver the traffic to a destination STA. The traffic between STAs within a BSS may be peer-to-peer traffic. Such peer-to-peer traffic may be sent between the source and destination STAs, e.g., with a direct link setup (DLS) using an IEEE 802.11e DLS, an IEEE 802.11z tunneled DLS (TDLS), and/or the like. A WLAN using an Independent BSS (IBSS) mode may have no APs, and the STAs may communicate directly with each other. This mode of communication may be referred to as an ad-hoc mode.

Using the IEEE 802.11 infrastructure mode of operation, the AP may transmit a beacon on a fixed channel, e.g., the primary channel. This channel may be 20 MHz wide and may be the operating channel of the BSS. This channel may be used by the STAs to establish a connection with the AP. The channel access in an IEEE 802.11 system may be Carrier Sense Multiple Access with Collision Avoidance (CSMA/CA). In this mode of operation, the STAs, including the AP, may sense the primary channel. If the channel is detected to be busy, the STA may back off. A single STA may transmit at any given time in a given BSS.

In IEEE 802.11n, high throughput (HT) STAs may use a 40 MHz wide channel for communication. This may be achieved by combining the primary 20 MHz channel with an adjacent 20 MHz channel to form a 40 MHz wide contiguous channel. IEEE 802.11n may operate on 2.4 GHz and/or 5 GHz industrial, scientific and medical (ISM) band.

In IEEE 802.11ac, very high throughput (VHT) STAs may support 20 MHz, 40 MHz, 80 MHz, and/or 160 MHz wide channels. The 40 MHz and/or 80 MHz channels may be formed, for example, by combining contiguous 20 MHz channels. A 160 MHz channel may be formed, for example, by combining eight contiguous 20 MHz channels, or by combining two non-contiguous 80 MHz channels (e.g., which may be referred to as an 80+80 configuration). For the 80+80 configuration, the data (e.g., after channel encoding) may be passed through a segment parser that may divide it into two streams. Inverse Fast Fourier Transform (IFFT) and/or time domain processing may be performed on a stream (e.g., each stream), for example, separately. The streams may be mapped onto the two channels and the data may be transmitted. At the receiver this mechanism may be reversed, and the combined data may be sent to the MAC. IEEE 802.11ac may operate on 5 GHz ISM band.

IEEE 802.11af and IEEE 802.11ah may support sub 1 GHz modes of operation. The channel operating bandwidths may be reduced, for example, relative to those used in IEEE 802.11n and IEEE 802.11ac. IEEE 802.11af may support 5 MHz, 10 MHz, and/or 20 MHz bandwidths in the TV White Space (TVWS) spectrum. IEEE 802.11ah may support 1 MHz, 2 MHz, 4 MHz, 8 MHz, and/or 16 MHz bandwidths, for example, using non-TVWS spectrum. IEEE 802.11ah may support Meter Type Control (MTC) devices in a macro coverage area. MTC devices may have capabilities including, for example, support for limited bandwidths and/or very long battery life.

In IEEE 802.11ad, very high throughput may use the 60 GHz band. A wide bandwidth spectrum at 60 GHz may be available, which may enable very high throughput operation. IEEE 802.11ad may support, for example, up to 2 GHz operating bandwidths. The data rate for IEEE 802.11ad may reach up to 6 Gbps. The propagation loss at 60 GHz may be more significant than at the 2.4 GHz and/or 5 GHz bands. Beamforming may be adopted in IEEE 802.11ad, for example, to extend the coverage range. To support the receiver requirements for this band, the IEEE 802.11ad MAC layer may be modified, for example, to allow channel estimation training. This may include omni (e.g., quasi-omni) modes of operation and/or beamformed modes of operation.

WLAN systems may support multiple channels and channel widths, for example, according to IEEE 802.11n, IEEE 802.11ac, IEEE 802.11af, IEEE 802.11ah, and/or the like. WLAN systems may include a channel that may be designated as the primary channel. The primary channel may have a bandwidth that may be equal to the largest common operating bandwidth supported by the STAs in the BSS. The bandwidth of the primary channel may be limited by a STA that supports the smallest bandwidth operating mode. In the example of 802.11ah, the primary channel may be 1 MHz wide if there are STAs (e.g., MTC type devices) that are limited to supporting a 1 MHz mode, for example, even if the AP and/or other STAs in the BSS may support a 2 MHz, 4 MHz, 8 MHz, 16 MHz, or other channel bandwidth operating mode. The carrier sensing and/or Network Allocation Vector (NAV) settings may depend on the status of the primary channel. If the primary channel is busy, for example, due to a STA supporting a 1 MHz operating mode transmitting to the AP, the available frequency bands may be considered busy even though a majority of the bands may stay idle and available.

In the United States, for example, the available frequency bands that may be used by IEEE 802.11ah may range from 902 MHz to 928 MHz. In Korea, for example, the available frequency bands may range from 917.5 MHz to 923.5 MHz. In Japan, for example, the available frequency bands may range from 916.5 MHz to 927.5 MHz. The total bandwidth available for IEEE 802.11ah may range from 6 MHz to 26 MHz, for example, and may depend on the country code.

In multi-band operation, a communication session may be transferred from a 60 GHz frequency band to a lower frequency band, such as a 5 GHz frequency band, for example. A multi-band capable device may manage operation over one or more frequency bands. The multi-band capable device may support operation on multiple frequency bands, for example, simultaneously. The multi-band capable device may support operation on one frequency band at a time and may transfer between frequency bands.

A multi-band capable device may support multiple MAC sublayers. The multi-band capable device may be coordinated by a multiple MAC station management entity (MM-SME). A multi-band management entity may be defined in the SME and may be responsible for the operations and/or functions of fast session transfer (FST). There may be two FST modes defined in IEEE 802.11ad, e.g., transparent FST and/or non-transparent FST. With transparent FST, the multi-band capable device may use the same media access control (MAC) address on multi-bands. For example, the source and the destination MAC addresses (e.g., in both the old and the new frequency bands) may be the same. With non-transparent FST, one or more bands in the device may utilize one or more MAC addresses.

A multi-band procedure may include one or more of the following operations between two or more (e.g., a pair) of multi-band capable devices: setup, configuration, tear down, and/or transfer of FST sessions from one frequency band to another. The on-channel tunneling (OCT) operation may allow a STA of a multi-band capable device to transmit a MAC management protocol data unit (MMPDU) that may be constructed by a different STA of the same device. By using OCT, a multi-band capable device may encapsulate a packet and transmit it on another frequency band. This may enable the SMEs of a pair of multi-band capable devices to provide a seamless FST.

FIG. 1 is a diagram of an example of a channel coordination mechanism. A common channel may be defined and the STAs and/or APs may operate on the common channel. For example, a device (e.g., STA A) may initiate a transmission by sending a request to switch (RTX) on a common channel to another device (e.g., STA B). The RTX may carry the information about the destination channel in which the transmission may take place. The STA B may reply with a clear to switch (CTX) on the common channel to accept or reject the transmission request. The CTX may include the information about the destination channel. If STA A and STA B agree to the transmission, the STAs may switch to the destination channel (e.g., Channel m) within a pre-defined time period and perform transmission. After the transmission over the destination channel ends, the STA A and STA B may switch back to the common channel.

In IEEE 802.11ai, the STAs may connect to a specific radio band. If the BSS load on the current band (e.g., 2.4 GHz) is not enough to accommodate additional STAs, the AP may redirect the STAs to the AP on other band (e.g., 5 GHz), for example, by including the neighbor AP information in the probe response and/or beacon so that the STAs may scan and/or associate with the neighbor AP. The neighbor AP information may include one or more of the following: band ID, operation class, channel list, target beacon transmission time (TBTT) of the APs, interworking information element (IE) of the AP, and/or the like.

IEEE 802.11aj may provide enhancements for very high throughput to support, for example, one or more 40-50 GHz and/or 59-64 GHz frequency bands (e.g., Chinese frequency bands). Beamforming training for a multiband capable millimeter wave device, which may usually be performed for 45 GHz and/or 60 GHz transmission, may be completed with the help of a 2.4 GHz/5 GHz band. For example, the beamforming training feedback frames may be transmitted via a 2.4 GHz/5 GHz band.

Devices may support operation on different frequency channels with different channel bandwidths and/or may provide different transmission data rates, for example, in IEEE 802.11. For example, IEEE 802.11ad may support very high data rates (e.g., up to 6 Gbps) and/or may operate in the 60 GHz frequency band. Due to the nature of the propagation loss in the 60 GHz frequency band, the typical coverage range may be short (e.g., 10 meters). IEEE 802.11n/ac may operate in the 2.4 GHz/5 GHz frequency band, which may support high data rates with better coverage than that of IEEE 802.11ad. Sub-1 GHz transmissions (e.g., IEEE 802.11ah, IEEE 802.11af, and/or the like) may provide good coverage range, while the data rate may be limited. IEEE 802.11aj may provide very high throughput to support bands, for example, 40-50 GHz and/or 59-64 GHz frequency bands (e.g., Chinese frequency bands).

Figure 2:
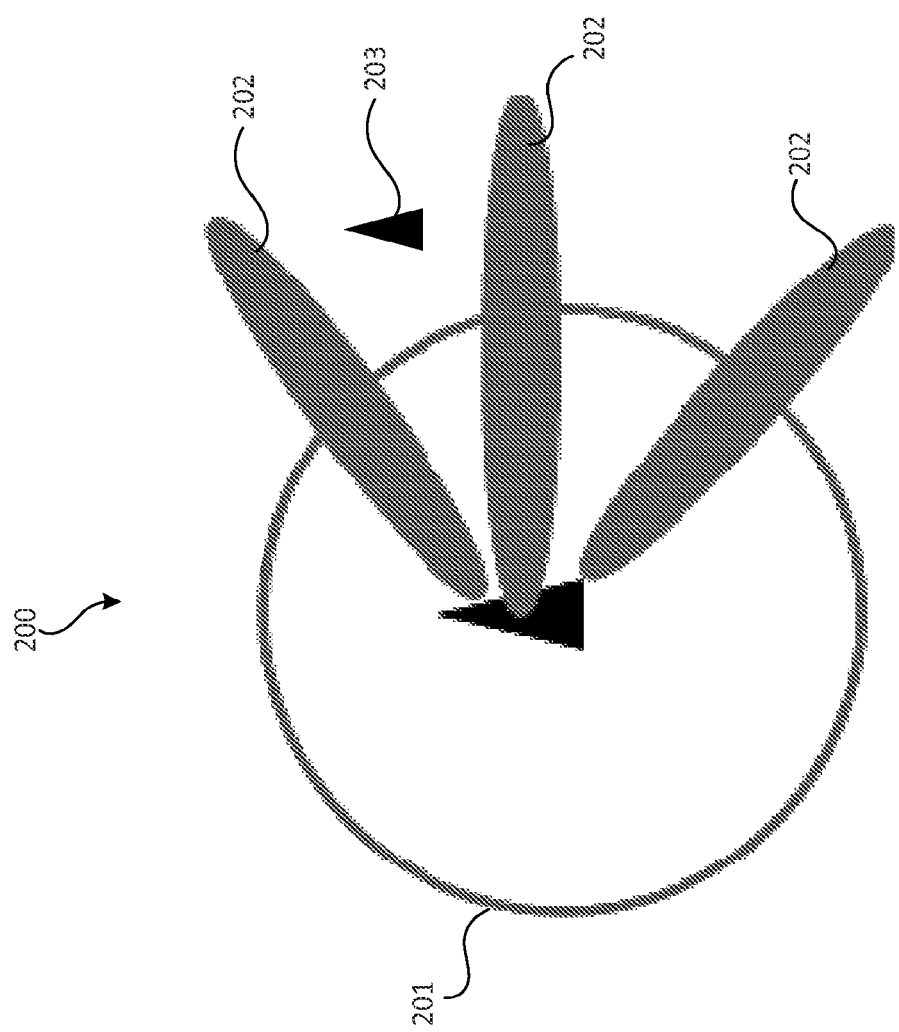
FIG. 2 is a diagram of an example of omni range transmission.

The coverage range of beamformed transmission and/or omni transmission within the same frequency band may be different. Beamforming may extend the coverage range in one or more directions. Omni transmissions (e.g., quasi-omni transmissions) may provide uniform coverage in one or more of the directions (e.g., all/each of the directions). A quasi-omni transmission may refer to an omni-transmission where uniform coverage is provided in substantially all of the directions. FIG. 2 is a diagram of an example of omni range transmission. A Request to Send (RTS) and/or Clear to Send (CTS) may be transmitted via an omni antenna pattern. The omni antenna may not provide full protection for beamformed transmissions. For example, diagram 200 may illustrate an example of the range of an omni transmission 201 and an example of the range of a beamformed transmission 202. The coverage range of the beamformed transmission 202 may be larger than the coverage range of the omni transmission 201. As such, one or more users 203 who may be out of the coverage range of a RTS and/or CTS (e.g., which may be sent via an omni transmission pattern) may face interference from beamformed transmissions 202.

Beamforming training (e.g., beam-switch based beamforming training) may introduce extra interference to neighboring co-channel transmissions. For example, with IEEE 802.11ad, the beamforming training may be performed by sweeping one or more beam sectors. The coverage range of the beamforming training may cover one or more directions (e.g., each of the directions) and/or may be larger than the omni transmission. The beamforming training may not be protected by WLAN protection mechanisms, for example, such as omni RTS and/or CTS transmitted on the same frequency band. The beamforming training may create extra interference to other devices operating in the same frequency band and/or may be vulnerable to transmissions from other devices.

An AP may announce its presence and/or its BSS's operating parameters, for example, by transmitting beacon frames. An AP may transmit beacon frames using a sectorized antenna beam pattern, for example, in order to extend coverage. Due to the limited beamwidth of the sectorized antenna beam patterns, a complete sweep of the coverage area of an AP may, for example, take several beacon intervals, which may lead to delays in the AP discovery process.

A device that is capable of transmitting and/or receiving on multiple frequency bands may choose to operate on the multiple bands in parallel. The operations on multiple-bands may be independent. For example, a dual band WiFi AP may operate on a 2.4 GHz band and a 5 GHz band, which may be equivalent to having two co-located APs, one operating on a 2.4 GHz band and another operating on a 5 GHz band, for example, with or without cooperation between the two APs.

Multiple bands may be allowed to cooperate such that the transmissions on the one or more bands may be more efficient. Multiband operation (e.g., cooperative multiband operation) may consider the characteristics of one or more bands (e.g., each band). For example, a band with longer coverage range but limited bandwidth may be utilized to carry control and/or management information. A band with shorter coverage range and large bandwidth may be utilized to carry data traffic. A band with less interference may be used for control information. A band with more interference may be used for data transmission.

Figure 3:
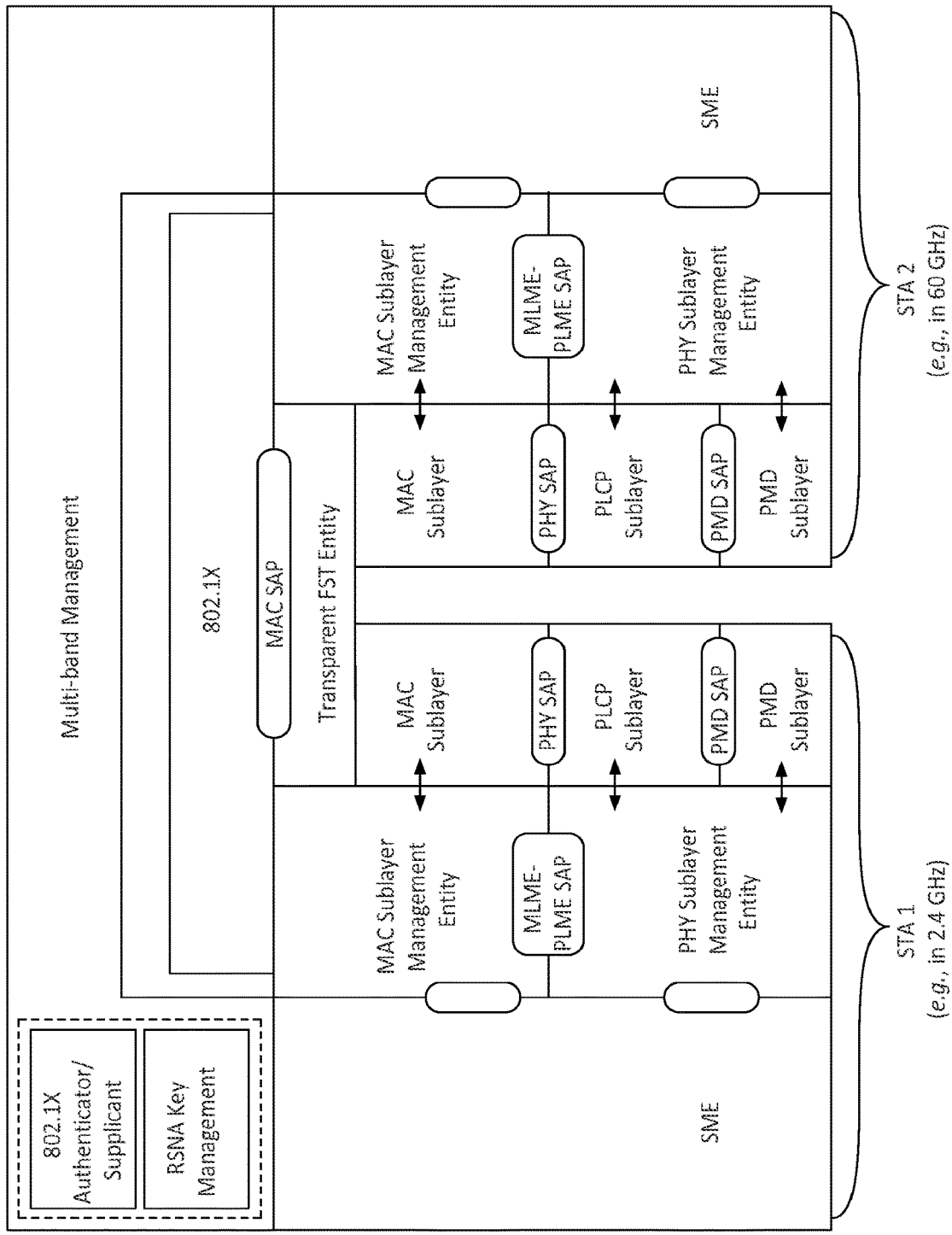
FIG. 3 is a diagram of an example reference model for transparent multiband operation.

FIG. 3 is a diagram of an example reference model for transparent multiband operation. The architecture, for example, may be associated with an IEEE 802.11ad reference model for transparent multiband operation. The multiband management sublayer may be located in the upper MAC. The upper MAC may be in charge of the coordination of one or more MAC sublayers. Reference models similar to the example reference model illustrated in FIG. 3 may be used.

Directional transmission may be adopted as a mode for transmission (e.g., an optional or mandatory mode for transmission). Directional transmission may depend on the characteristics of the frequency band. For example, with IEEE 802.11ad, directional transmissions on a 60 GHz frequency band may be mandatory and training procedures for such directional/beamforming transmission may be mandatory. Directional transmission and/or training for directional transmission may introduce extra interference in the system. For example, a STA may transmit a training frame multiple times using the lowest modulation and coding scheme (MCS) level and/or maximum power. A STA may sweep multiple transmit antenna sectors. This may create interference in the directions the transmit antenna sectors may point in. The transmission may not be protected (e.g., entirely protected) using the omni RTS/CTS signals on the same band, for example, because the coverage range of omni transmission may be less than that of sectorized and/or directional transmission (e.g., as described with reference to FIG. 2).

Figure 4:
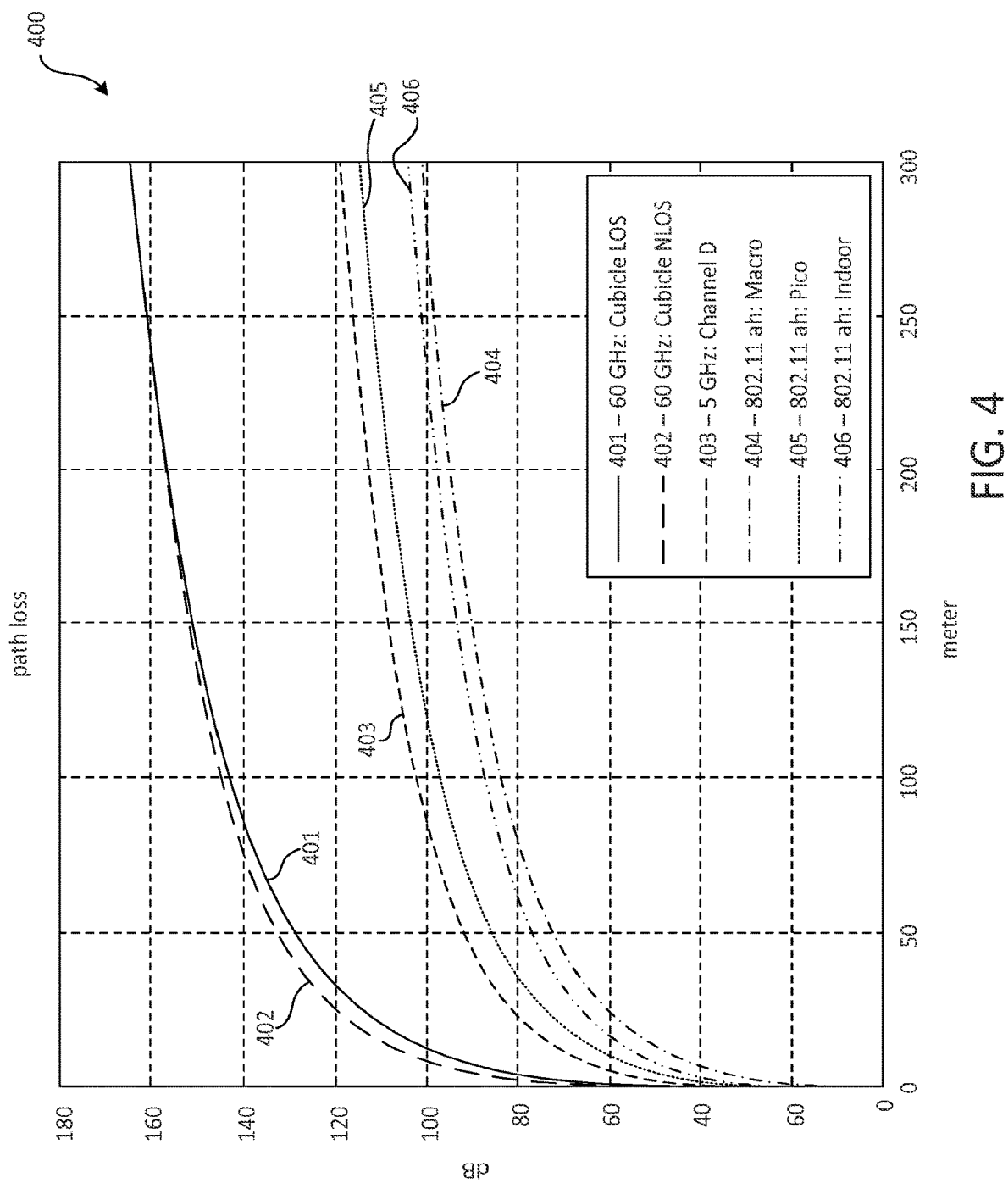
FIG. 4 is a diagram of example path loss models that may be used in one or more WiFi channels.

The propagation loss of radio signals in different frequency bands may vary. FIG. 4 is a diagram of an example path loss models that may be used in one or more WiFi channels. For example, the path loss model 400 of FIG. 4 may be used in WiFi channels on 60 GHz, 5 GHz and/or 900 MHz frequency bands. As illustrated by example in FIG. 4, the coverage range of the 60 GHz bands 401, 402 may be less than that of the 5 GHz band 403 and/or the 900 MHz bands 404, 405, 406. With the beamforming gain, the coverage range of the 60 GHz band transmissions may be less than the 5 GHz band transmissions. As such, the power controlled and/or MCS controlled omni transmissions (e.g., RTS, CTS, and/or the like) on the 5 GHz band and/or a 900 MHz band may be used to protect the directional transmission on the 60 GHz band.

Figure 5:
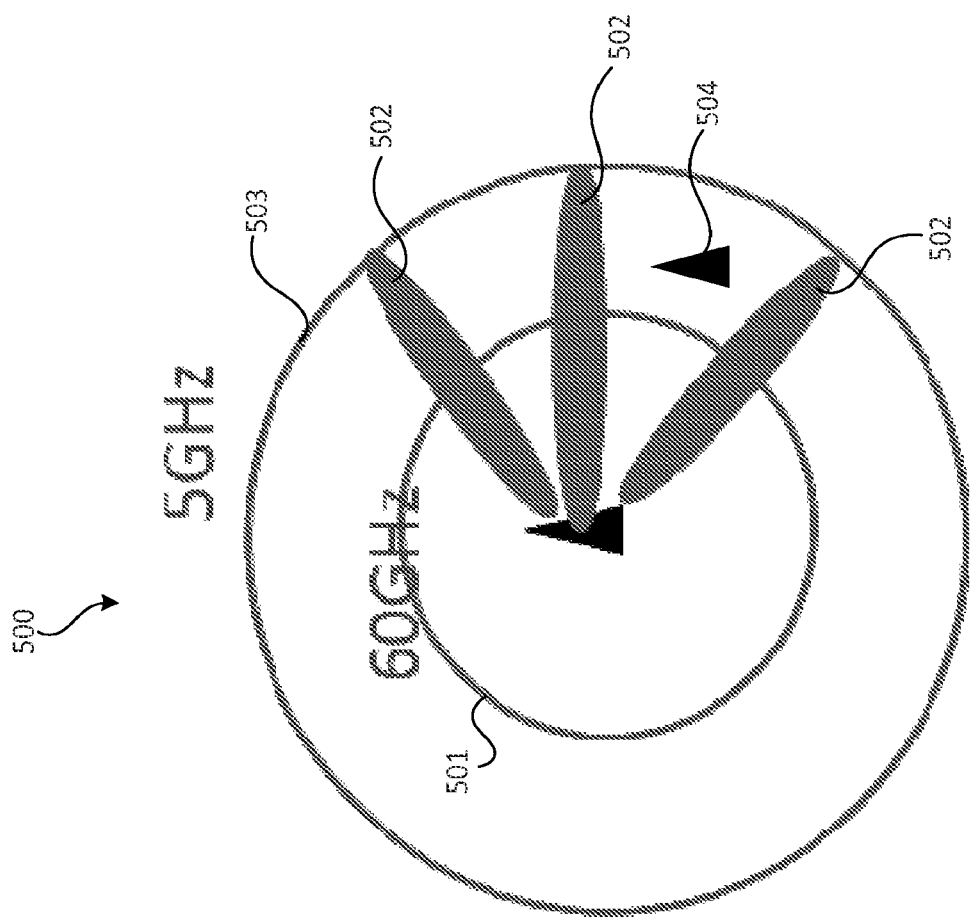
FIG. 5 is a diagram of an example modulation and coding scheme (MCS) controlled and/or power controlled request to send/clear to send (RTS/CTS) transmission on a 5 GHz band to protect the beamforming and/or beamforming training transmissions on a 60 GHz band.

FIG. 5 is a diagram of an example MCS controlled and/or power controlled RTS/CTS transmission on a 5 GHz band to protect the beamforming and/or beamforming training transmissions on a 60 GHz band. In order to protect the beamforming and/or beamforming training transmission on the 60 GHz band, RTS and/or CTS protection (e.g., which may be RTS/CTS-like protection) may be provided on a different frequency band, for example, a 5 GHz band. For example, the diagram 500 illustrates an example coverage area of omni transmission via a 60 GHz band 501, an example of the range of beamforming transmission via the 60 GHz band 502, and the coverage area of omni transmission via a 5 GHz band 503. A user 504 (e.g., a WTRU) outside the coverage area of omni transmission on the 60 GHz band 501, but within the range of a beamforming transmission on the 60 GHz band 502, may be protected via RTS and/or CTS protection via omni transmission on the 5 GHz band 503. As such, RTS and/or CTS protection may provide one or more users 504 within the coverage range of a beamformer and/or a beamformee to set their NAV accordingly. RTS and/or CTS protection may provide protection on directional training and/or transmission. The RTS and/or CTS protection may be MCS controlled and/or power controlled, for example, such that the maximum coverage range of the protection frames may be equal to the maximum coverage range of the directional transmission protected. Although described with reference to a 5 GHz band and a 60 GHz band, the example of FIG. 5 may be applicable to omni transmission via a first band and directional transmission via a second band, where for example, the first band may be of a lower frequency than the second band.

Figure 6:
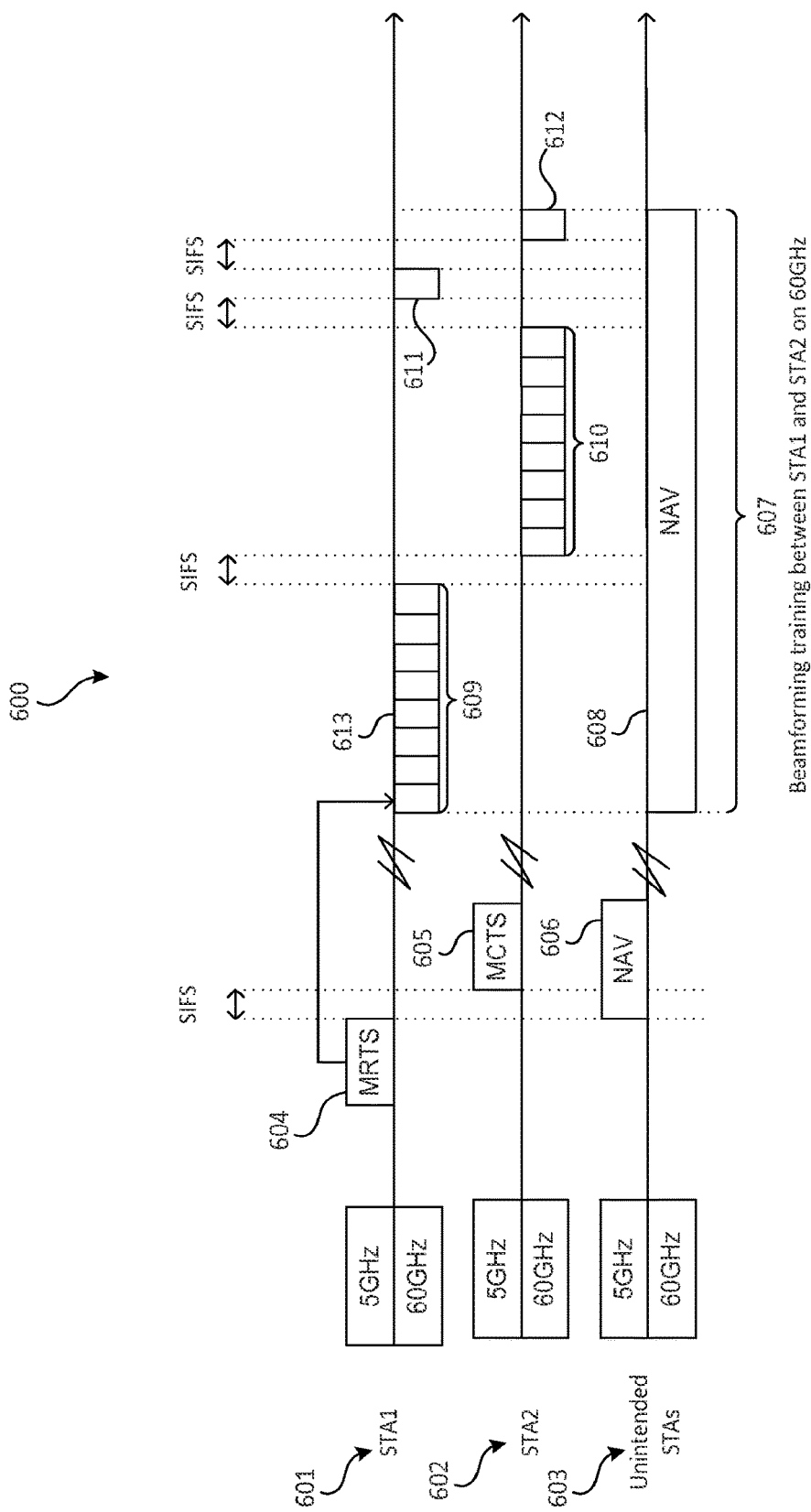
FIG. 6 is a diagram of an example multi-band request to send/multi-band clear to send (MRTS/MCTS) protected directional training and/or transmission.

Multiband RTS (MRTS) and/or multiband CTS (MCTS) may be used for directional transmission protection using multiband operation. FIG. 6 is a diagram of an example MRTS and/or MCTS protected directional training and/or transmission. In the example diagram 600 of FIG. 6, a station STA1 601 and a station STA2 602 may intend to perform beamforming training, for example, on a 60 GHz band. The stations STA1 601 and STA2 602 may use MRTS and/or MCTS transmitted on a 5 GHz band to schedule and/or protect the 60 GHz band transmission, for example, to protect one or more unintended STAs 603 from interference caused by directional training and/or other transmissions on the 60 GHz band. One or more of the following may apply.

The STA1 601 may transmit a request on the 5 GHz band to the STA2 602. The request may be associated with a different frequency band from which it is sent. For example, the request may be sent via a first frequency band (e.g., the 5 GHz band) and may be associated with a second frequency band (e.g., the 60 GHz band). The request may include a MRTS transmission, for example, MRTS frame 604. The MRTS frame 604 may be sent via the 5 GHz band but may be associated with the 60 GHz band. For example, the request (e.g., the MRTS frame 604) may be associated with a beamforming transmission (e.g., beamforming transmission 609 and/or beamforming transmission 610) that may be scheduled to be sent via the 60 GHz band. A beamforming transmission may include one or more beamforming training signals, beamforming transmission signals, and/or the like. For example, a beamforming signal 613 may be an example of a beamforming training signal or a beamforming transmission signal of beamforming transmission 609. The STA1 601 may send the MRTS frame 604 on the 5 GHz band and the MRTS frame 604 may be associated with a transmission (e.g., a beamforming training signal) on the 60 GHz band. The STA1 601 may schedule the transmission (e.g., a beamforming transmission, such as a transmission of one or more beamforming training signals) on the 60 GHz band by indicating an allocation start time and/or duration of the transmission (e.g., the beamforming transmission) via the MRTS frame 604.

The request may be for a transmit opportunity (TxOP) reservation. The TxOP reservation may be a reservation for a transmission on a frequency band that may different from the frequency band of the request. For example, the request may be sent via the 5 GHz band and the request may be for a TxOP reservation for the 60 GHz band. For example, STA1 601 may send a request on a first frequency band (e.g., the 5 GHz band) for a TxOP reservation for a second frequency band (e.g., the 60 GHz band). The TxOP reservation may be a reservation to perform beamforming training and/or beamforming transmissions (e.g., send and/or receive one or more beamforming transmissions) on the second frequency band.

The STA2 602 may receive the request transmitted via the 5 GHz band. For example, the STA2 602 may receive the MRTS frame 604 transmitted via the 5 GHz band. The STA2 602 may determine that the received MRTS frame 604 may be a packet for itself, for example, by checking the MAC header of the MRTS frame 604. The STA2 602 may accept or reject the request (e.g., the TxOP reservation, the scheduling of the beamforming schedule on the 60 GHz band, etc.), for example, according to one or more of the following. The STA2 602 may transmit a MCTS frame 605 to the STA1 601, for example, via the 5 GHz frequency band, which when received, may indicate that the STA2 602 accepts the request. The STA2 602 may transmit the MCTS frame 605 one short inter-frame space (SIFS) after the MRTS frame 604. The MCTS frame 605 may include a field that indicates whether STA2 602 accepts or rejects the schedule. The STA2 602 may transmit the MCTS frame 605 back to the STA1 601, for example, when STA2 602 accepts the schedule (e.g., only when the STA2 602 accepts the schedule). The STA1 601 may determine that STA2 602 rejects the schedule, for example, if the STA1 601 does not receive the MCTS frame 605 within an MCTS timeout period.

The one or more unintended STAs 603 may receive the request (e.g., the MRTS frame 604) from the STA1 601 sent via the 5 GHz band. The one or more unintended STAs 603 may be within the range of a 5 GHz omni (e.g., quasi-omni) transmission, but may not be within the range of a 60 GHz omni transmission. The unintended STAs 603 may determine that the request (e.g., the MRTS frame 604) is not intended for them, for example, by checking the MAC header of the MRTS frame 604. The unintended STAs 603 may set their NAV 606 on the 5 GHz band to avoid interfering with the MCTS frame 605 sent by the STA2 602 to the STA1 601 in response to the request (e.g., the MRTS frame 604).

If STA1 601 and STA2 602 agree with the transmission on the 60 GHz band (e.g., the TxOP), then STA1 601 and STA2 602 may begin the transmission (e.g., the beamforming transmission), for example, over the scheduled period 607. The transmission on the 60 GHz band may not follow (e.g., immediately follow) the transmission of the MRTS frame 604 and/or the MCTS 605 frame. The one or more unintended STAs 603, which may be multiband capable, may set their NAVs 608 on the 60 GHz band over the schedule period 607, for example, to avoid interfering with the scheduled transmission and/or to avoid receiving interference from the schedule transmission between STA1 601 and STA2 602. Further, the unintended STAs 603 may set their NAV on the 60 GHz band, for example, according to the allocation start time and/or duration of the allocation identified in MRTS 604 and/or MCTS 605 transmissions. As such, the STA1 601 and STA2 602 may perform the scheduled transmission (e.g., beamformed transmission) on the 60 GHz band without causing interference to and/or receiving interference from the one or more unintended STAs 603.

The STA1 601 may send the transmission in accordance with the request (e.g., the MRTS frame 604), for example, via the 60 GHz band. The transmission may be a beamforming transmission, which may include one or more beamforming signals (e.g., a sequence of beamforming training signals, a sequence of beamforming transmission signals, and/or the like). The transmission may be transmitted to a region associated with the STA2 602. For example, the STA1 601 may send the beamforming transmission 609 (e.g., which may include one or more frames, for example, beamforming training signal 613) on the 60 GHz band. The STA2 602 may receive the beamforming transmission 609. The STA2 602 may send a beamforming transmission 610 (e.g., which may include one or more frames) on the 60 GHz band, for example, one SIFS after the completion of the beamforming transmission 609. The STA1 601 may receive the beamforming transmission 610. The STA1 601 may reply with an ACK frame 611, for example, if it successfully receives the transmission 610. The STA2 602 may reply with an ACK frame 612, for example, if it successfully receives the transmission 609.

The example of MRTS/MCTS protected directional training and/or transmission described herein may be applied to devices transmitting on multiple frequency bands, for example, where one band may be associated with (e.g., may use) a quasi-omni transmission and another band may be associated with (e.g., may use) a directional transmission. Therefore, although 5 GHz and 60 GHz bands are used as an example in reference to FIG. 6, other frequency bands may be used.

The STA1 601 may receive a beamforming schedule, for example, via an AP. A beamforming schedule may refer to a beamforming training schedule and/or a beamforming transmission schedule. The beamforming training schedule and/or the beamforming transmission schedule may include a start time, a duration, a frequency band, and/or the like of a beamforming transmission (e.g., the beamforming transmission 609 and/or the beamforming transmission 610). The STA1 601 may receive the beamforming training schedule and/or the beamforming transmission schedule before transmitting a request (e.g., the MRTS frame 604) to the STA2 602 over the 5 GHz band, for example, if STA1 601 is a non-AP STA.

A STA may be an AP or a non-AP. For example, if a STA (e.g., STA1 601) is a non-AP STA, then it may receive a beamforming training schedule and/or a beamforming transmission schedule from an AP. If a STA (e.g., STA1 601) is an AP, then it may begin transmitting a request (e.g., a MRTS) without receiving a beamforming training schedule and/or a beamforming transmission schedule from an AP.

One or more MRTS and/or MCTS frame formats may be disclosed. MRTS and/or MCTS frames may be used, for example, to reserve a time slot for transmission on another frequency band. The scheduling information and/or frequency band information may be included in the body of the MRTS and/or MCTS frame. The MRTS and/or MCTS frames may include, for example, the schedule element field and/or multiband element field. The schedule element field may include one or more of an allocation start, an allocation block duration, a number of blocks, an allocation block period, and/or the like.

The multiband element field may be used to carry the information of the band used for beamforming training and/or transmission. The multiband element may include one or more of a multiband control field, a band ID field, a channel ID field, a BSSID field, a STA MAC address, and/or the like. The multiband control field may include one or more of the following. The multiband control field may include a STA role field. The STA role field may specify the role the transmitting STA may play on the target channel, for example, whether the STA may be an AP, a personal basic service set coordination point (PCP) or a non AP/PCP STA, and/or the like. The multiband control filed may include a STA MAC address present field. The multiband control field may include a pairwise cipher suit present field.

The band ID field may indicate the frequency band in which the beamforming training and/or transmission may take place. For example, the band ID field may be used to indicate that the 60 GHz frequency band may be the band for beamforming training and/or transmission. The channel ID field may indicate the frequency channel(s) in the frequency band indicated by the band ID that may be utilized for beamforming training and/or transmission. The BSSID field may specify the BSSID of the BSS operating on the channel and/or frequency band indicated by the band ID and/or the channel ID. The STA MAC address may indicate the MAC address of the STA in the band specified in the element. The STA MAC address may be the same as the MAC address of the operating band.

As such, the MRTS frame and/or the MCTS frame may include one or more of the following: a schedule element field, a multiband control field, a band identification (ID) field, a channel ID field, a band service set identification (BSSID) field, a station (STA) media access control (MAC) address field, and/or the like.

Figure 7:
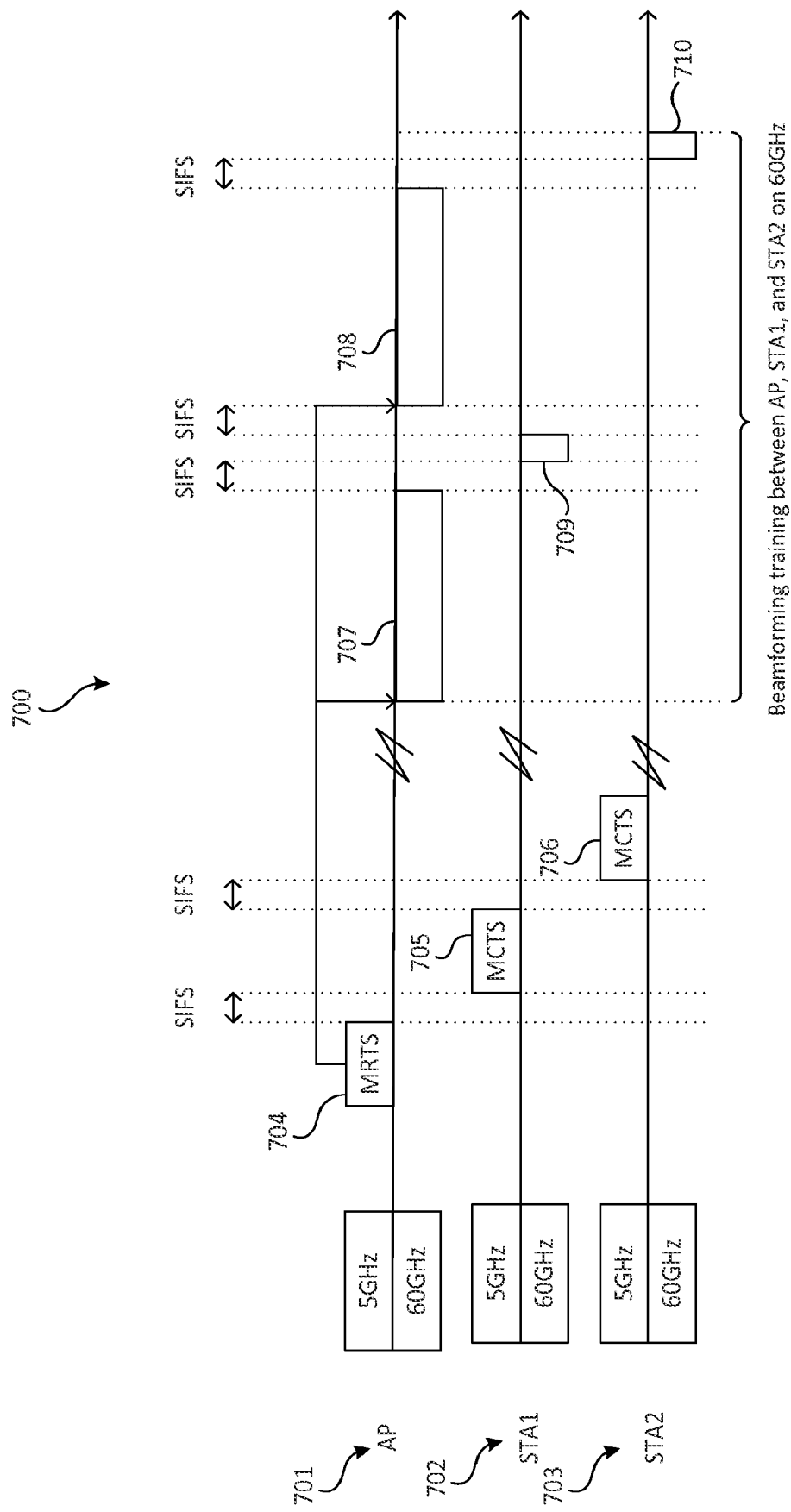
FIG. 7 is a diagram of an example use of MRTS/MCTS frames on a 5 GHz band to schedule transmissions on a 60 GHz band.

Extended multi-user MRTS/MCTS may be provided. A transmission sent via a first band (e.g., a MRTS frame and/or a MCTS frame on a 5 GHz band) may schedule a transmission on a second band (e.g., a beamforming transmission on a 60 GHz band), for example, for multiple users. FIG. 7 is a diagram 700 of an example use of MRTS/MCTS frames on a 5 GHz band to schedule transmissions on a 60 GHz band. The diagram 700 may be similar to the diagram 600, except the diagram 700 may illustrate an example of a multi-user (e.g., AP, 701 scheduling with STA1 702 and STA2 703) embodiment. The transmission on the 5 GHz band may follow the CSMA/CA protocol, while the transmission on the 60 GHz band may be contention free based. One or more of the following may be provided.

An AP 701 may transmit a request on a 5 GHz band to schedule a multi-user transmission on a 60 GHz band. The request may include a MRTS frame 704. The request (e.g., the MRTS frame 704) may include the schedule elements for STA1 702 and STA2 703 on the 60 GHz band. STA1 702 may receive the request (e.g., the MRTS frame 704) on the 5 GHz band. The STA1 702 may determine (e.g., according to the MRTS frame 704) that the AP 701 intends to transmit a 60 GHz frame 707 to STA1 702 on the 60 GHz band at a determined time, for example, at time slot x1. STA1 702 may accept or reject this schedule, for example, as described herein. For example, STA1 702 may accept the schedule by transmitting MCTS frame 705 to the AP 701, for example, one SIFS after the MRTS frame 704.

The STA2 703 may receive the MRTS frame 704 on the 5 GHz band. The STA2 703 may determine (e.g., according to the MRTS frame 704) that the AP 701 intends to transmit a 60 GHz frame 708 to STA2 703 on the 60 GHz band at a determined time, for example, at time slot x2. The STA2 703 may determine that it may be the second user in the multi-user scheduling. The STA2 703 may wait for the STA1 702 to send a MCTS frame 705. For example, the STA2 703 may send its own MCTS frame 706 one SIFS after the completion of the MCTS frame 705 from STA1 702. For example, the STA2 703 may wait for the AP 701 to send a poll frame and the STA2 703 may reply by transmitting the MCTS frame 706.

The AP 701 may transmit a frame 707 on the 60 GHz band at time slot x1. The STA1 702 may reply with an ACK frame 709, for example, if it successfully detected the frame. The AP 701 may transmit a frame 708 on the 60 GHz band at time slot x2. The STA2 703 may reply with an ACK frame 710, for example, if it successfully detected the frame. The frame 707 and/or the frame 708 may include one or more frames, for example, the frame 707 and/or the frame 708 may be a beamforming transmission that includes one or more beamforming training signals (e.g., as described with reference to FIG. 6).

The AP 701 may arrange multi-user transmissions on the 60 GHz band sequentially in this example. For example, the transmissions to the STAs 702, 703 may be separable in the time domain in FIG. 7. In one or more embodiments, the transmissions to the STAs 702, 703 may be separable in the frequency domain, the spatial domain, the code domain, and/or the time domain.

The AP 701 may use a group ID to signal a group of users (e.g., STAs) within a scheduling group. The group ID may be defined and maintained by the AP 701. The group ID may be included in the SIG field of the physical layer convergence protocol (PLCP) header.

Dedicated MRTS/MCTS for 60 GHz band beamforming training may be provided. With IEEE 802.11ad, directional/beamforming transmission may be used. To support directional/beamforming transmission, beamforming training implementations may be used, which for example, may introduce overhead and/or may cause interference for the co-channel STAs. A sector level sweep (SLS) may be utilized for coarse beamforming training. In a SLS, sector sweep (SSW) frames may be utilized for transmit beamforming training and/or receive beamforming training. For transmit beamforming training, SSW frames may be transmitted and/or multiple antenna sectors (e.g., beams) may be swept. The receiver may select the best antenna sectors according to received signal strength and/or may send this information to the transmitter, for example, as feedback. For receive beamforming training, the SSW frames may be repeated N times using the best transmit antenna sector, the receiver may sweep the receive antenna sectors, and/or the receiver may select the best antenna sector (e.g., according to received signal strength). To protect the co-channel STAs from interference introduced by beamforming training, MRTS/MCTS protected directional training (e.g., as illustrated in FIG. 6) may be used. The MRTS/MCTS protected directional training may be extended further, which may allow additional overhead saving for BF training.

Figure 8:
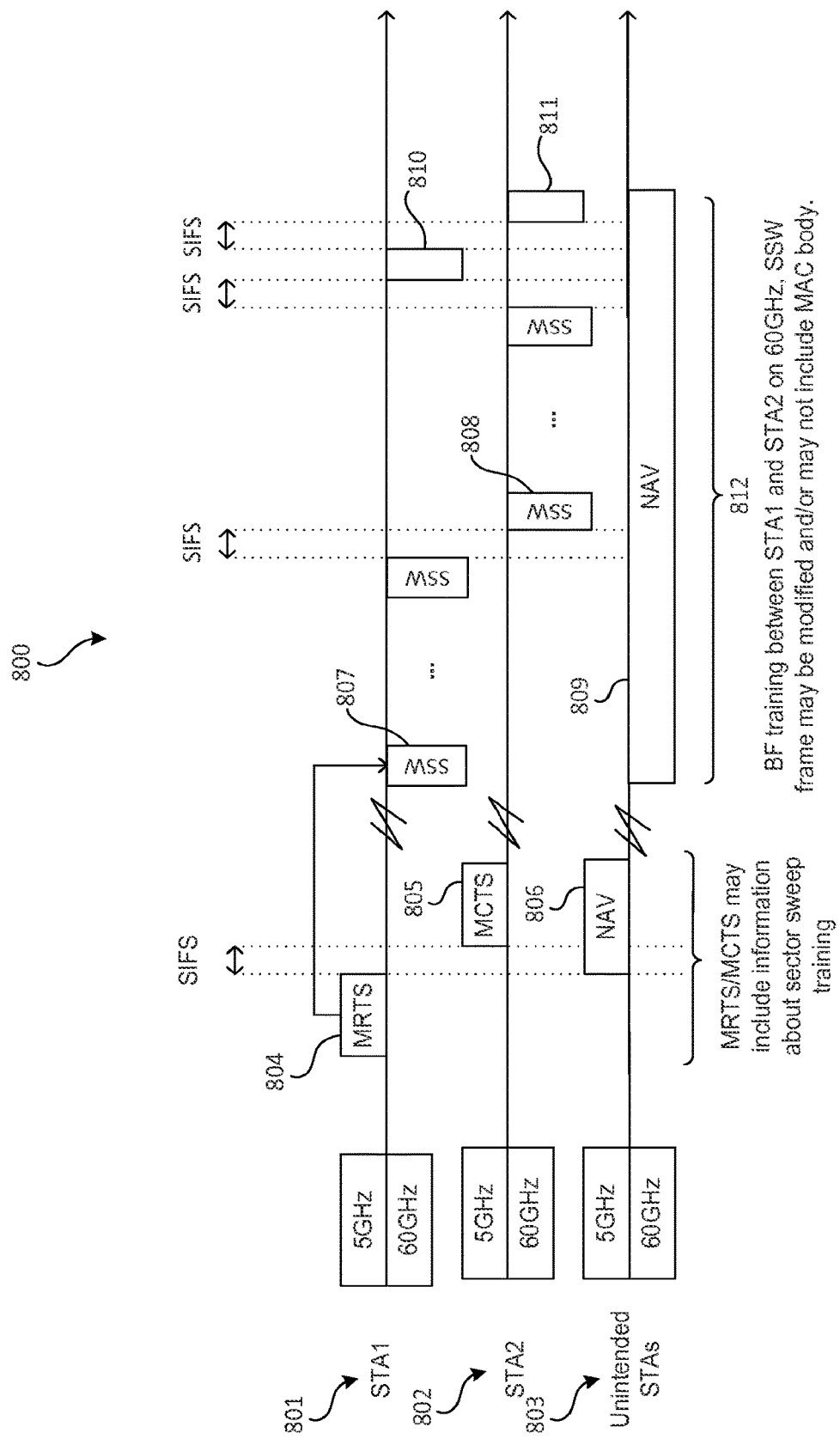
FIG. 8 is a diagram of an example dedicated MTRS/MCTS for a 60 GHz sector level sweep training.

FIG. 8 is a diagram of an example dedicated MTRS/MCTS for a 60 GHz sector level sweep training. The MRTS/MCTS frames and/or the SSW frames may be modified. The modified SSW frame may be referred to as a null SSW frame. The dedicated MRTS and/or MCTS frames defined for SLS training may include an SSW field and/or an SSW feedback field. The SSW field may be transmitted in the SSW frame and may indicate the directional multigigabit (DMG) antenna IDs and/or sector IDs that may be utilized for the SSW frame transmission. The SSW feedback field may include information that may be used for SSW feedback frames.

In IEEE 802.11ad, the SSW field and/or SSW feedback field may be carried by one or more SSW frames. The MRTS/MCTS frames may be transmitted on a different frequency band of the same or different WLAN specification. The null SSW frames may be SSW frames with the MAC body removed. The null SSW frames may be SSW frames with the short training field (STF), channel estimation (CE) field, and/or header field kept the same as the SSW frames.

In the example diagram 800 of FIG. 8, a station STA1 801 and a station STA2 802 may perform beamforming training using the SLS scheme on a 60 GHz band. The stations STA1 801 and STA2 802 may use MRTS and/or MCTS transmitted on a 5 GHz band to schedule and/or protect the 60 GHz band transmission, for example, to protect one or more unintended STAs 803 from interference caused by directional training and/or transmission on the 60 GHz band. One or more of the following may apply.

The STA1 801 may transmit a request on the 5 GHz band to STA2 802, which for example, may schedule a transmission (e.g., a beamforming transmission) on the 60 GHz band. The request may include a MRTS frame 804. For example, the STA1 801 may schedule a beamforming transmission on the 60 GHz band by indicating an allocation start time and/or duration of the beamforming transmission via the MRTS frame 804. The STA2 802 may receive the MRTS frame 804. The STA2 802 may determine that the received MRTS frame 804 may be a packet for itself, for example, by checking the MAC header of the MRTS frame 804.

The STA2 802 may accept or reject the scheduling on the 60 GHz band transmission, for example, according to one or more of the following. The STA2 802 may transmit a MCTS frame 805 to the STA1 801, for example, one SIFS after the MRTS frame 804. The MCTS frame 805 may include a field that indicates whether STA2 802 accepts or rejects the schedule. The STA2 802 may transmit the MCTS frame 805 back to the STA1 801, for example, when STA2 802 accepts the schedule. The STA1 801 may determine that STA2 802 rejects the schedule, for example, if STA1 801 does not receive the MCTS frame 805 within the MCTS timeout period. The MRTS 804 and/or MCTS 805 may be a modified MRTS and/or MCTS, for example, modified to include a SSW field and/or a SSW feedback field.

The one or more unintended STAs 803 may receive the MRTS frame 804 from the STA1 801. The one or more unintended STAs 803 may be within the range of a 5 GHz omni transmission, but not within the range of a 60 GHz omni transmission. The unintended STAs 803 may determine that the MRTS frame 804 is not intended for them, for example, by checking the MAC header of the MRTS frame 804. The unintended STAs 803 may set their NAV 806 on the 5 GHz band to avoid interfering with the MCTS frame 805 sent by the STA2 802 to the STA1 801 in response to the MRTS frame 804.

If STA1 801 and STA2 802 agree with the scheduled transmission on the 60 GHz band, then STA1 801 and STA2 802 may begin transmission (e.g., beamforming transmission) over the scheduled period 812. The scheduled transmission on the 60 GHz band may not follow (e.g., immediately follow) the transmission of the MRTS frame 804 and/or the MCTS 805 frame. The one or more unintended STAs 803, which may be multiband capable, may set their NAVs 808 on the 60 GHz band over the schedule period 812, for example, to avoid interfering with the scheduled transmission and/or to avoid receiving interference from the schedule transmission between STA1 801 and STA2 802.

The STA1 801 may transmit the one or more SSW frames 807 (e.g., the beamformed transmission) on the 60 GHz band. The STA2 802 may transmit the one or more SSW frames 808 (e.g., the beamformed transmission) on the 60 GHz band, for example, one SIFS after the completion of the SSW transmission 807 by STA1 801. The SSW frames 808 may include information relating to an antenna sector (e.g., the best antenna sector) for a beamforming training schedule. The SSW frames 807, 808 may be modified, for example, the SSW frames 807, 808 may include one or more Null SSW frames. The STA1 801 may reply with an ACK frame 810, for example, if it successfully receives the SSW transmission 808. The STA2 802 may reply with an ACK frame 811, for example, if it successfully receives the SSW transmission 807. As such, the STA1 801 and STA2 802 may perform the scheduled transmission (e.g., a beamformed transmission including the SSW frames) on the 60 GHz band without causing interference to and/or receiving interference from the one or more unintended STAs 803.

A beamforming transmission (e.g., as described with reference to FIG. 6) may include one or more SSW frames, for example, as described in reference to FIG. 8. For example, the beamforming signal (e.g., beamforming training signal) 613 may include a SSW frame.

The example of MRTS/MCTS protected directional training and/or transmission described herein may be applied to devices transmitting on multiple frequency bands, for example, where one band may use omni transmission and another band may use directional transmission. Therefore, although 5 GHz and 60 GHz bands are used as an example, other frequency bands may be used.

Multiband aided AP/STA discovery may be provided. When a device is equipped with multiple WiFi interfaces, for example, including different STAs that may adhere to different WLAN standards, the STAs within the coverage range of the multi-band device (MBD) may have different characteristics, for example, such as coverage area, omni-directional or directional beamwidth capabilities, data rates, etc. The different characteristics may be leveraged to aid and/or to speed up the AP discovery for a STA within multi-band devices.

For example, a multi-band device (e.g., MBD1) may include a STA (e.g., STA1-B1, operating on frequency band 1 (B1)), and another STA (e.g., STA1-B2, operating on frequency band 2 (B2)). The STA1-B1 may utilize on channel tunneling (OCT) to instruct the STA1-B2 to conduct scanning for other multi-band devices (e.g., MBD2) that may have STAs on the B1 and B2 bands. The MBD2 may have, for example, STA2-B1 operating on B1 and STA2-B2 operating on B2. The OCT scanning may establish links and/or associations, e.g., between STA1-B1 and STA2-B1 that may not be associated (e.g., currently associated).

In order to speed up the OCT AP discovery process, a scanning MBD (e.g., MBD1) may include a parameter, for example, a RESTRICTIONS in the OCT MLME-SCAN.request in the form of, for example, a parameter (e.g., each parameter) specified for MLME-SCAN.request (e.g., as per 802.11ad), a peer multi-band element (e.g., as per 802.11ad), a local multi-band element (e.g., as per 802.11ad), a channel specific multi-band element (e.g., as per 802.11ac), a RESTRICTIONS, and/or the like.

The RESTRICTIONS may include one or more (e.g., a set) of parameters restricting the scanning process. The RESTRICTIONS may be implemented in different ways, for example, depending on characteristics of the STAs and/or the WLAN specification with which the STAs may be attempting to establish a link/association. For example, if IEEE 802.11ad STAs, STA1-B1 and STA2-B1 may be operating on 60 GHz band and the RESTRICTIONS may include one or more of the distance between STA1-B1 and STA2-B1, an angle of arrival, a sector ID, and/or the like. The distance between STA1-B1 and STA2-B1 may be included in MBD1 and MBD2 (e.g., respectively). The distance between MBD1 and MBD2 may be derived from an interpretation of receive power parameters, for example, such as RSSI, RCPI, RPI, etc. For angle of arrival, scanning may be limited to scanning for MBDs within certain angles of arrival. For Sector ID, scanning may be limited to scanning for MBDs/STAs within a certain sector(s), for example, which may be identified by Sector ID(s). Similar restrictions may be used for IEEE 802.11aj STAs operating on another frequency band, for example, a 45 GHz band. Channel specific band restrictions may be used. For example, multi-band associations may be restricted to use by the primary channel in a VHT type device, for example, such as a STA that may support multi-band operation using a variation of the IEEE 802.11ac and/or IEEE 802.11ad specifications.

The BSSDescriptions in the OCT MLME-SCAN.confirm may be expanded with parameters, such as Discovery Information. The Discover Information may include one or more of the distance between STAs (e.g., STA1-B1 and STA2-B1), the angle of arrival, the sector ID(s), and/or the like. The distance between STAs (e.g., STA1-B1 and STA2-B1) may be included in MBD1 and MBD2, e.g., respectively. The distance between MBD1 and MBD2 may be derived from an interpretation of the receive power parameters, for example, such as the received signal strength indicator (RSSI), the received channel power indicator (RCPI), the received power indicator (RPI), etc. The angle of arrival of STA2-B2's transmission when received at STA1-B2 may indicate the relative position of MBD1 and MBD2. The Sector ID may include, for example, the transmitting sector ID of the STA2-B2's transmission and/or a receiving Sector ID(s) when received at STA1-B2.

The discovery may be limited to discovery between category, types, and/or classes of STAs. For example, a STA may be categorized as one or more of a meter type, a backhaul type, an offload type, a high throughput type device, a relay, and/or the like. Discovery may include additional restrictions using this information. A multi-band AP discovery (e.g., an expedited multi-band AP discovery) may include one or more of the following.

An MBD (e.g., MBD1) may want to establish link/association for one or more of its STAs (e.g., STA1-B1) operating on B1 band with another MBD operating on B1 and B2 bands. A MBD's SME (e.g., MBD1's SME) may send a MLME-SCAN.request to NT-MLME with parameters suitable for STA1-B1. The MLME-SCAN.request may include the parameter RESTRICTIONS. The NT-MLME (non-transmitting MLME) may send an OCT MLME-SCAN.request including the parameter RESTRICTIONS to the TR-MLME (Transmitting MLME). For example, the MBD1 may include a STA1-B2, which may be an IEEE 802.11ad STA operating on a 60 GHz band, and a STA1-B1, which may be an IEEE 802.11ac STA operating on a 5 GHz band. In this case, the NT-MLME may be an IEEE 802.11ad MLME and the TR-MLME may be an IEEE 802.11ac MLME. Since STA1-B1 may have a coverage range of approximately 10 m, the parameter RESTRICTIONS may be a distance of approximately 10 m, or a RSSI, a RCPI, and/or a RPI associated with a propagation distance that may be equal to or shorter than approximately 10 m. The STA(s) may restrict their operation to one or more channels, for example, as indicated in the parameters for RESTRICTIONS. A STA may recommend to the AP a specific channel for the discovery that may be determined by the STA as having suitable characteristics for the discovery procedure. For example, a narrow band channel may support a longer range than other available channels.

The TR-MLME may conduct active and/or passive scanning according to the scanning mode specified. One or more of the following may apply. The TR-MLME may use a specific scanning based on the parameter RESTRICTIONS in the OCT MLME-SCAN.request, for example. If the parameter RESTRICTIONS is RSSI, RCPI, and/or RPI based, the TR-MLME may record APs of which the packets, beacons, etc., satisfy the RSSI, RCPI, and/or RPI requirements in passive scanning. In active scanning, the TR-MLME may include a RESTRICTIONS element in its probe request frames, which may solicit probe responses from STAs, APs, and/or PCPs that have received the probe request frames beyond a RSSI, RCPI, and/or RPI level. If the parameter RESTRICTIONS is angle of arrival and/or sector ID based, the TR-MLME may use beamformed transmissions of probe request to solicit responses from STAs, APs, and/or PCPs within a certain region of the coverage area. If the parameter RESTRICTIONS is based of STA types, the TR-MLME may include a RESTRICTIONS information element (IE) in its probe request frame to solicit responses from certain types of STAs. When a STA receives such a probe request frame with a RESTRICTIONS element, it may respond if it satisfies the RESTRICTIONS specified in the RESTRICTIONS element.

For a BSS and/or STA, the TR-MLME may measure and/or record the following discovery info, for example, based on the measurement at STA1-B2, which for example may be an IEEE 802.11ac STA operating on the 5 GHz band. One or more of the distance between stations, the angle of arrival, the sector ID, the STA type, and/or the like may be included. The distance between STA1-B1 and STA2-B1 that may be included in MBD1 and MBD2, e.g., respectively. The distance between MBD1 and MBD2 may be derived from an interpretation of the receive power parameters, for example, such as RSSI, RCPI, RPI, and/or the like. The angle of arrival may relate to the angle of arrival of STA2-B2's transmission when received at STA1-B2, which may indicate the relative positions of MBD1 and MBD2. The Sector ID may include, for example, the transmitting sector ID of the STA2-B2's transmission and/or a receiving Sector ID when received at STA1-B2. The STA type may report the type of the STA being reported.

The TR-MLME may provide Discovery Information for a (e.g., each) BSSDescription using the OCT MLME-SCAN.confirm primitive to the NT-MLME and/or to the SME. This may be at the end of the scanning process and/or when an AP and/or BSS may be discovered. A STA (e.g., STA1-B1) may use the Discovery Information to send out a probe request, a DMG beacon, and/or the like, to another STA (e.g., STA2-B1). The STA1-B1 may start fine beam training with STA2-B1 directly, for example, if sufficient information may have been obtained on the relative position of the STA2-B1, which may be a part of MBD2. The STA1-B1 may conduct association directly with STA2-B1, which may be a part of MBD2, for example, if sufficient information is obtained from the discovery info. The STA1-B1 may conduct DLS/TDLS link establishment, relay negotiations, and/or establish robust security network association (RSNA) with STA2-B1, which may be a part of MBD2, for example, if sufficient information is obtained from the Discovery Information.

Although the examples described with reference to FIGS. 6-8 may use SIFS, in one or more embodiments other IFSs may be used. For example, IFS of varying sizes may be used during MRTS and/or MCTS protected directional training and/or transmission, for example, as described with reference to FIGS. 6-8.

Figure 9A:
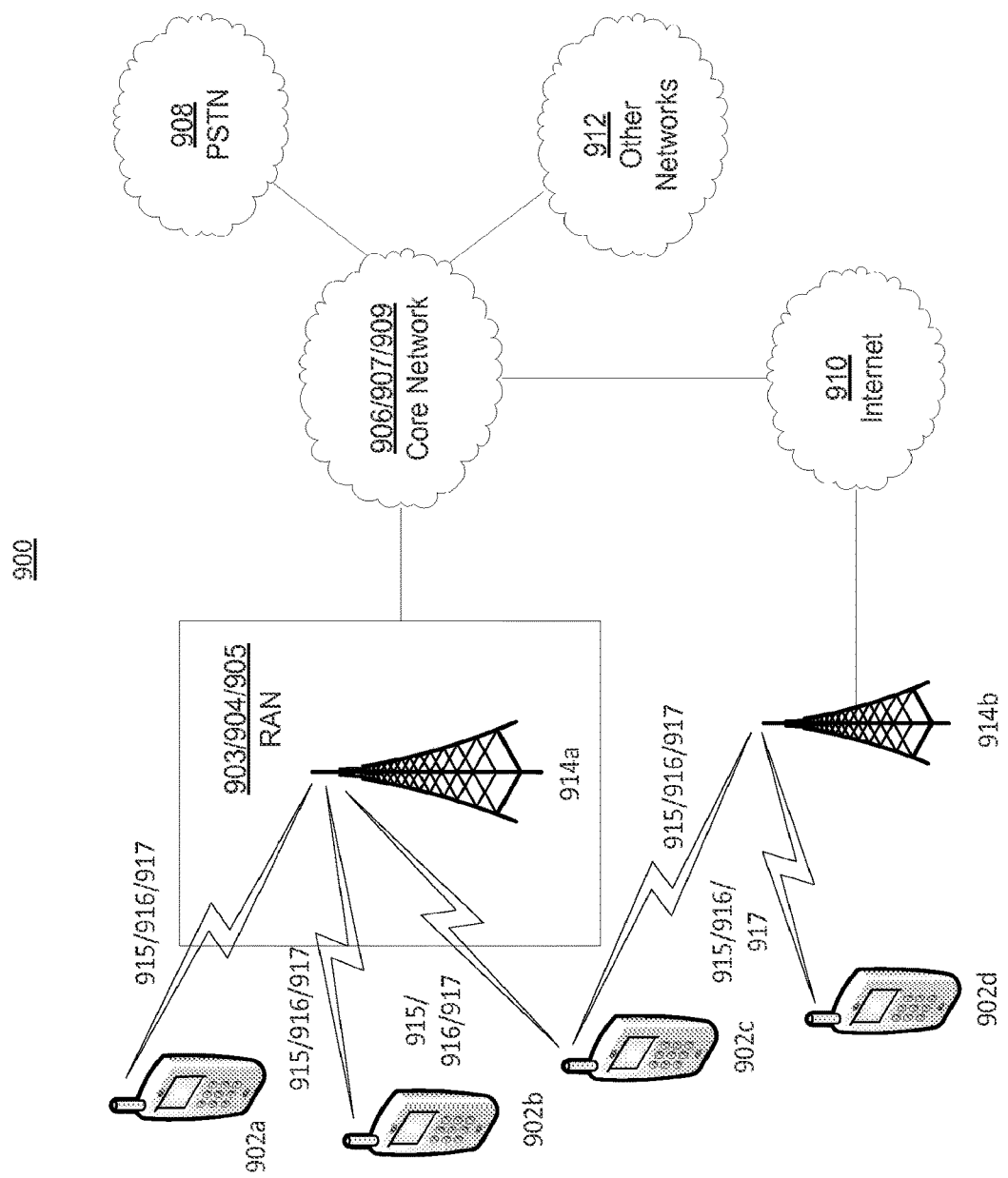
FIG. 9A is a system diagram of an example communications system in which one or more disclosed embodiments may be implemented.

FIG. 9A is a diagram of an example communications system 900 in which one or more disclosed embodiments may be implemented. The communications system 900 may be a multiple access system that provides content, such as voice, data, video, messaging, broadcast, etc., to multiple wireless users. The communications system 900 may enable multiple wireless users to access such content through the sharing of system resources, including wireless bandwidth. For example, the communications systems 900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 9A, the communications system 900 may include wireless transmit/receive units (WTRUs) 902a, 902b, 902c, and/or 902d (which generally or collectively may be referred to as WTRU 902), a radio access network (RAN) 903/904/905, a core network 906/907/909, a public switched telephone network (PSTN) 908, the Internet 910, and other networks 912, though it will be appreciated that the disclosed embodiments contemplate any number of WTRUs, base stations, networks, and/or network elements. Each of the WTRUs 902a, 902b, 902c, 902d may be any type of device configured to operate and/or communicate in a wireless environment. By way of example, the WTRUs 902a, 902b, 902c, 902d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 900 may also include a base station 914a and a base station 914b. Each of the base stations 914a, 914b may be any type of device configured to wirelessly interface with at least one of the WTRUs 902a, 902b, 902c, 902d to facilitate access to one or more communication networks, such as the core network 906/907/909, the Internet 910, and/or the networks 912. By way of example, the base stations 914a, 914b may be a base transceiver station (BTS), a Node-B, an eNode B, a Home Node B, a Home eNode B, a site controller, an access point (AP), a wireless router, and the like. While the base stations 914a, 914b are each depicted as a single element, it will be appreciated that the base stations 914a, 914b may include any number of interconnected base stations and/or network elements.

The base station 914a may be part of the RAN 903/904/905, which may also include other base stations and/or network elements (not shown), such as a base station controller (BSC), a radio network controller (RNC), relay nodes, etc. The base station 914a and/or the base station 914b may be configured to transmit and/or receive wireless signals within a particular geographic region, which may be referred to as a cell (not shown). The cell may further be divided into cell sectors. For example, the cell associated with the base station 914a may be divided into three sectors. Thus, in one embodiment, the base station 914a may include three transceivers, e.g., one for each sector of the cell. In an embodiment, the base station 914a may employ multiple-input multiple output (MIMO) technology and, therefore, may utilize multiple transceivers for each sector of the cell.

The base stations 914a, 914b may communicate with one or more of the WTRUs 902a, 902b, 902c, 902d over an air interface 915/916/917, which may be any suitable wireless communication link (e.g., radio frequency (RF), microwave, infrared (IR), ultraviolet (UV), visible light, etc.). The air interface 915/916/917 may be established using any suitable radio access technology (RAT).

More specifically, as noted above, the communications system 900 may be a multiple access system and may employ one or more channel access schemes, such as CDMA, TDMA, FDMA, OFDMA, SC-FDMA, and the like. For example, the base station 914a in the RAN 903/904/905 and the WTRUs 902a, 902b, 902c may implement a radio technology such as Universal Mobile Telecommunications System (UMTS) Terrestrial Radio Access (UTRA), which may establish the air interface 915/916/917 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 914a and the WTRUs 902a, 902b, 902c may implement a radio technology such as Evolved UMTS Terrestrial Radio Access (E-UTRA), which may establish the air interface 915/916/917 using Long Term Evolution (LTE) and/or LTE-Advanced (LTE-A).

In an embodiment, the base station 914a and the WTRUs 902a, 902b, 902c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 914b in FIG. 9A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 914b and the WTRUs 902c, 902d may implement a radio technology such as IEEE 802.11 to establish a wireless local area network (WLAN). In an embodiment, the base station 914b and the WTRUs 902c, 902d may implement a radio technology such as IEEE 802.15 to establish a wireless personal area network (WPAN). In yet an embodiment, the base station 914b and the WTRUs 902c, 902d may utilize a cellular-based RAT (e.g., WCDMA, CDMA2000, GSM, LTE, LTE-A, etc.) to establish a picocell or femtocell. As shown in FIG. 9A, the base station 914b may have a direct connection to the Internet 910. Thus, the base station 914b may not be required to access the Internet 910 via the core network 906/907/909.

The RAN 903/904/905 may be in communication with the core network 906/907/909, which may be any type of network configured to provide voice, data, applications, and/or voice over internet protocol (VoIP) services to one or more of the WTRUs 902a, 902b, 902c, 902d. For example, the core network 906/907/909 may provide call control, billing services, mobile location-based services, pre-paid calling, Internet connectivity, video distribution, etc., and/or perform high-level security functions, such as user authentication. Although not shown in FIG. 9A, it will be appreciated that the RAN 903/904/905 and/or the core network 906/907/909 may be in direct or indirect communication with other RANs that employ the same RAT as the RAN 903/904/905 or a different RAT. For example, in addition to being connected to the RAN 903/904/905, which may be utilizing an E-UTRA radio technology, the core network 906/907/909 may also be in communication with a RAN (not shown) employing a GSM radio technology.

The core network 906/907/909 may also serve as a gateway for the WTRUs 902a, 902b, 902c, 902d to access the PSTN 908, the Internet 910, and/or other networks 912. The PSTN 908 may include circuit-switched telephone networks that provide plain old telephone service (POTS). The Internet 910 may include a global system of interconnected computer networks and devices that use common communication protocols, such as the transmission control protocol (TCP), user datagram protocol (UDP) and the internet protocol (IP) in the TCP/IP internet protocol suite. The networks 912 may include wired or wireless communications networks owned and/or operated by other service providers. For example, the networks 912 may include a core network connected to one or more RANs, which may employ the same RAT as the RAN 903/904/905 or a different RAT.

Some or all of the WTRUs 902a, 902b, 902c, 902d in the communications system 900 may include multi-mode capabilities, e.g., the WTRUs 902a, 902b, 902c, 902d may include multiple transceivers for communicating with different wireless networks over different wireless links. For example, the WTRU 902c shown in FIG. 9A may be configured to communicate with the base station 914a, which may employ a cellular-based radio technology, and with the base station 914b, which may employ an IEEE 802 radio technology.

Figure 9B:
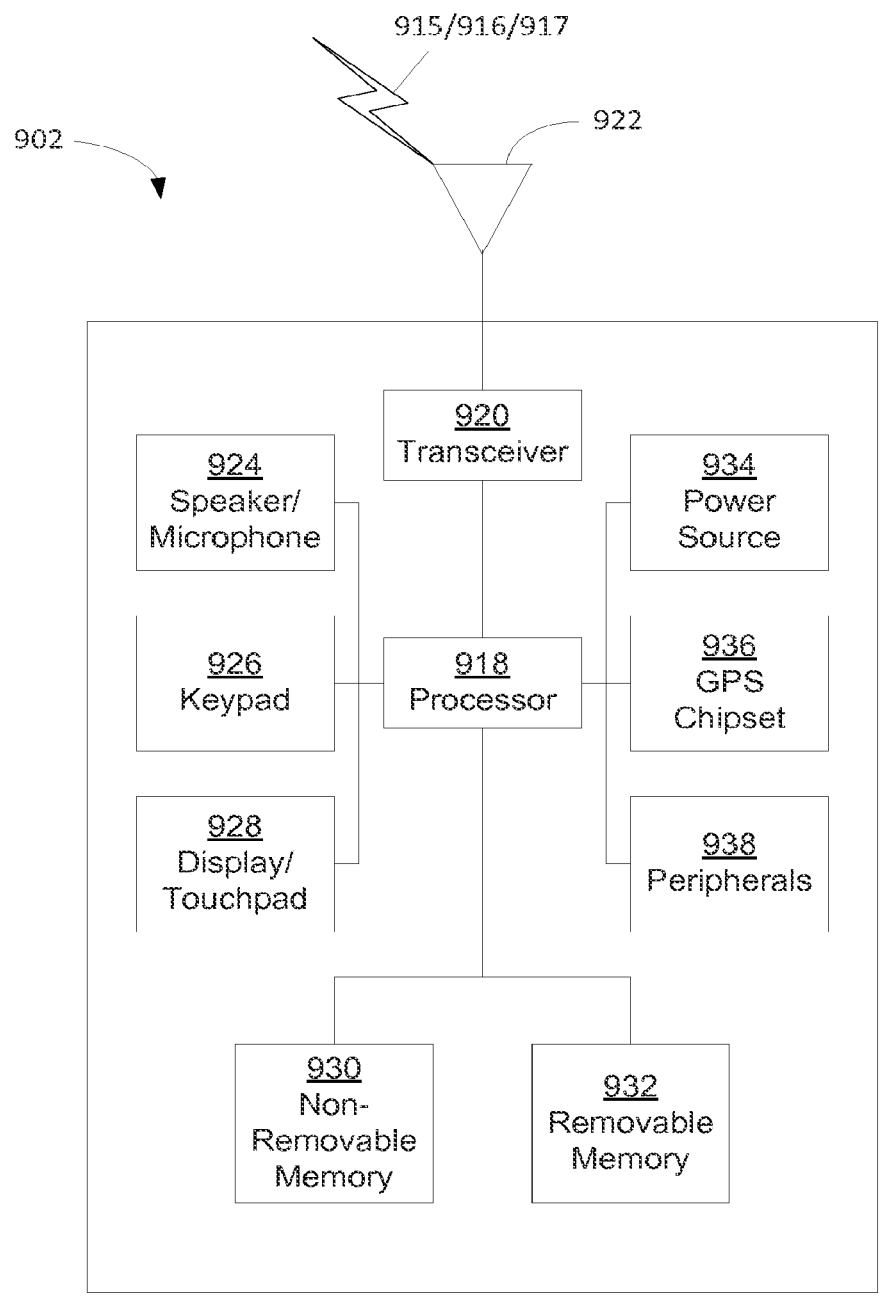
FIG. 9B is a system diagram of an example wireless transmit/receive unit (WTRU) that may be used within the communications system illustrated in FIG. 9A.

FIG. 9B is a system diagram of an example WTRU 902. As shown in FIG. 9B, the WTRU 902 may include a processor 918, a transceiver 920, a transmit/receive element 922, a speaker/microphone 924, a keypad 926, a display/touchpad 928, non-removable memory 930, removable memory 932, a power source 934, a global positioning system (GPS) chipset 936, and other peripherals 938. It will be appreciated that the WTRU 902 may include any sub-combination of the foregoing elements while remaining consistent with an embodiment. Also, embodiments contemplate that the base stations 914a and 914b, and/or the nodes that base stations 914a and 914b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 9B and described herein.

The processor 918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the WTRU 902 to operate in a wireless environment. The processor 918 may be coupled to the transceiver 920, which may be coupled to the transmit/receive element 922. While FIG. 9B depicts the processor 918 and the transceiver 920 as separate components, it will be appreciated that the processor 918 and the transceiver 920 may be integrated together in an electronic package or chip.

The transmit/receive element 922 may be configured to transmit signals to, or receive signals from, a base station (e.g., the base station 914a) over the air interface 915/916/917. For example, in one embodiment, the transmit/receive element 922 may be an antenna configured to transmit and/or receive RF signals. In an embodiment, the transmit/receive element 922 may be an emitter/detector configured to transmit and/or receive IR, UV, or visible light signals, for example. In yet an embodiment, the transmit/receive element 922 may be configured to transmit and receive both RF and light signals. It will be appreciated that the transmit/receive element 922 may be configured to transmit and/or receive any combination of wireless signals.

In addition, although the transmit/receive element 922 is depicted in FIG. 9B as a single element, the WTRU 902 may include any number of transmit/receive elements 922. More specifically, the WTRU 902 may employ MIMO technology. Thus, in one embodiment, the WTRU 902 may include two or more transmit/receive elements 922 (e.g., multiple antennas) for transmitting and receiving wireless signals over the air interface 915/916/917.

The transceiver 920 may be configured to modulate the signals that are to be transmitted by the transmit/receive element 922 and to demodulate the signals that are received by the transmit/receive element 922. As noted above, the WTRU 902 may have multi-mode capabilities. Thus, the transceiver 920 may include multiple transceivers for enabling the WTRU 902 to communicate via multiple RATs, such as UTRA and IEEE 802.11, for example.

The processor 918 of the WTRU 902 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 930 and/or the removable memory 932. The non-removable memory 930 may include random-access memory (RAM), read-only memory (ROM), a hard disk, or any other type of memory storage device. The removable memory 932 may include a subscriber identity module (SIM) card, a memory stick, a secure digital (SD) memory card, and the like. In an embodiment, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. For example, the power source 934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 918 may also be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 915/916/917 from a base station (e.g., base stations 914a, 914b) and/or determine its location based on the timing of the signals being received from two or more nearby base stations. It will be appreciated that the WTRU 902 may acquire location information by way of any suitable location-determination method while remaining consistent with an embodiment.

The processor 918 may further be coupled to other peripherals 938, which may include one or more software and/or hardware modules that provide additional features, functionality and/or wired or wireless connectivity. For example, the peripherals 938 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 9C:
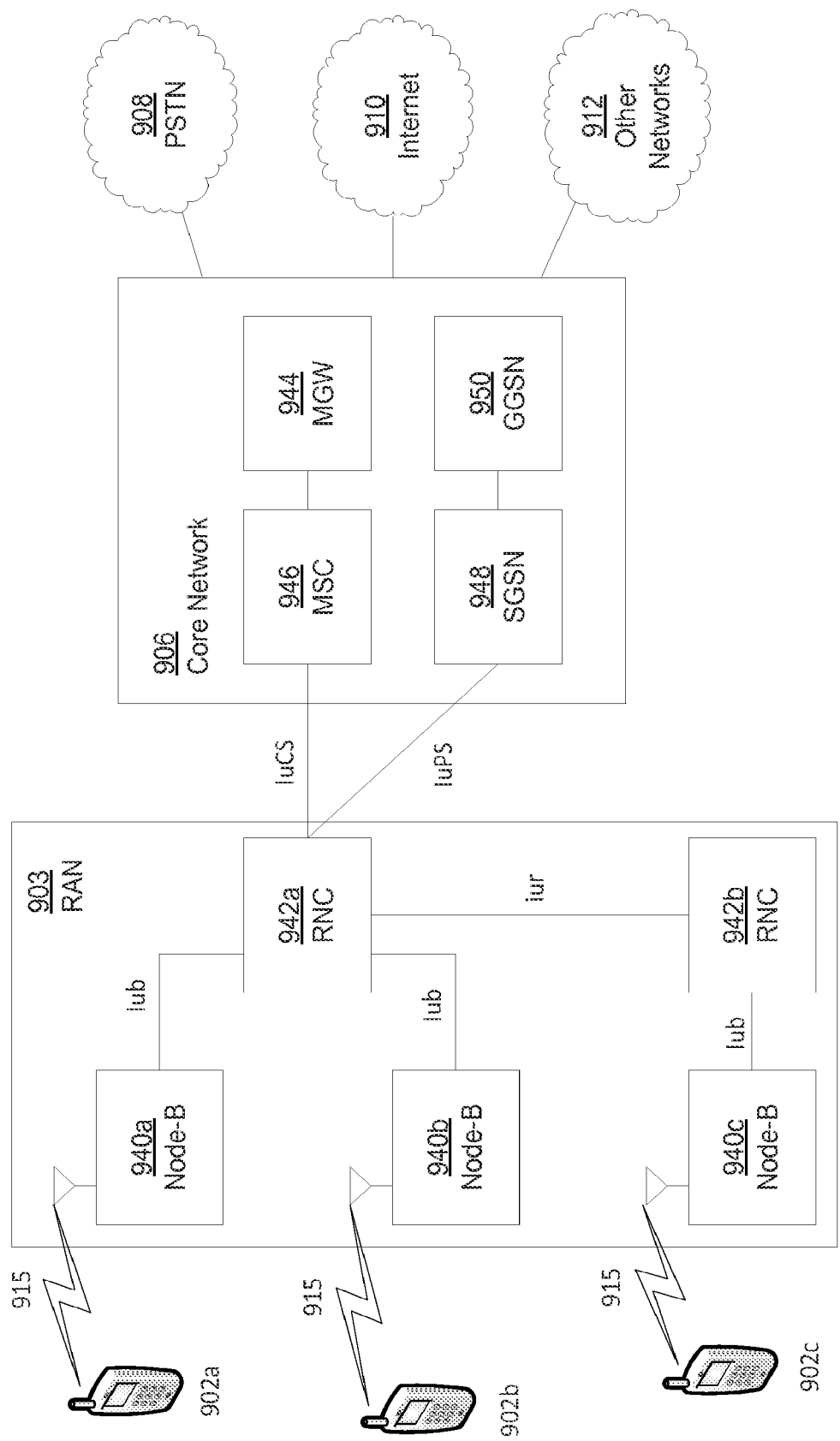
FIG. 9C is a system diagram of an example radio access network and an example core network that may be used within the communications system illustrated in FIG. 9A.

FIG. 9C is a system diagram of the RAN 903 and the core network 906 according to an embodiment. As noted above, the RAN 903 may employ a UTRA radio technology to communicate with the WTRUs 902a, 902b, 902c over the air interface 915. The RAN 903 may also be in communication with the core network 906. As shown in FIG. 9C, the RAN 903 may include Node-Bs 940a, 940b, 940c, which may each include one or more transceivers for communicating with the WTRUs 902a, 902b, 902c over the air interface 915. The Node-Bs 940a, 940b, 940c may each be associated with a particular cell (not shown) within the RAN 903. The RAN 903 may also include RNCs 942a, 942b. It will be appreciated that the RAN 903 may include any number of Node-Bs and RNCs while remaining consistent with an embodiment.

As shown in FIG. 9C, the Node-Bs 940a, 940b may be in communication with the RNC 942a. Additionally, the Node-B 940c may be in communication with the RNC 942b. The Node-Bs 940a, 940b, 940c may communicate with the respective RNCs 942a, 942b via an Iub interface. The RNCs 942a, 942b may be in communication with one another via an Iur interface. Each of the RNCs 942a, 942b may be configured to control the respective Node-Bs 940a, 940b, 940c to which it is connected. In addition, each of the RNCs 942a, 942b may be configured to carry out or support other functionality, such as outer loop power control, load control, admission control, packet scheduling, handover control, macro diversity, security functions, data encryption, and the like.

The core network 906 shown in FIG. 9C may include a media gateway (MGW) 944, a mobile switching center (MSC) 946, a serving GPRS support node (SGSN) 948, and/or a gateway GPRS support node (GGSN) 950. While each of the foregoing elements are depicted as part of the core network 906, it will be appreciated that any one of these elements may be owned and/or operated by an entity other than the core network operator.

The RNC 942a in the RAN 903 may be connected to the MSC 946 in the core network 906 via an IuCS interface. The MSC 946 may be connected to the MGW 944. The MSC 946 and the MGW 944 may provide the WTRUs 902a, 902b, 902c with access to circuit-switched networks, such as the PSTN 908, to facilitate communications between the WTRUs 902a, 902b, 902c and traditional land-line communications devices.

The RNC 942a in the RAN 903 may also be connected to the SGSN 948 in the core network 906 via an IuPS interface. The SGSN 948 may be connected to the GGSN 950. The SGSN 948 and the GGSN 950 may provide the WTRUs 902a, 902b, 902c with access to packet-switched networks, such as the Internet 910, to facilitate communications between and the WTRUs 902a, 902b, 902c and IP-enabled devices.

As noted above, the core network 906 may also be connected to the networks 912, which may include other wired or wireless networks that are owned and/or operated by other service providers.

Figure 9D:
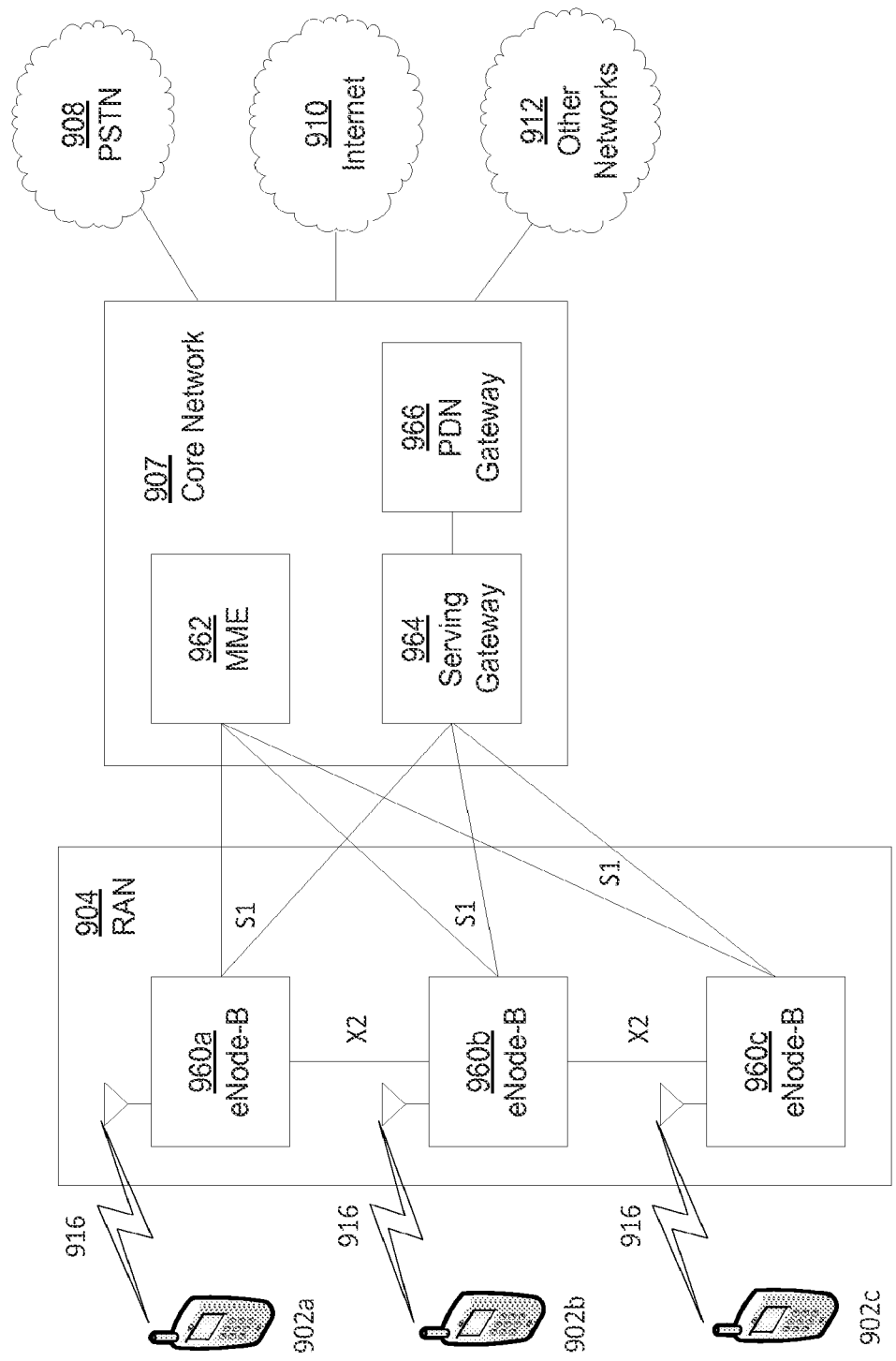
FIG. 9D is a system diagram of an example radio access network and an example core network that may be used within the communications system illustrated in FIG. 9A.

FIG. 9D is a system diagram of the RAN 904 and the core network 907 according to an embodiment. As noted above, the RAN 904 may employ an E-UTRA radio technology to communicate with the WTRUs 902a, 902b, 902c over the air interface 916. The RAN 904 may also be in communication with the core network 907.

The RAN 904 may include eNode-Bs 960a, 960b, 960c, though it will be appreciated that the RAN 904 may include any number of eNode-Bs while remaining consistent with an embodiment. The eNode-Bs 960a, 960b, 960c may each include one or more transceivers for communicating with the WTRUs 902a, 902b, 902c over the air interface 916. In one embodiment, the eNode-Bs 960a, 960b, 960c may implement MIMO technology. Thus, the eNode-B 960a, for example, may use multiple antennas to transmit wireless signals to, and receive wireless signals from, the WTRU 902a.

Each of the eNode-Bs 960a, 960b, 960c may be associated with a particular cell (not shown) and may be configured to handle radio resource management decisions, handover decisions, scheduling of users in the uplink and/or downlink, and the like. As shown in FIG. 9D, the eNode-Bs 960a, 960b, 960c may communicate with one another over an X2 interface.

The core network 907 shown in FIG. 9D may include a mobility management gateway (MME) 962, a serving gateway 964, and a packet data network (PDN) gateway 966. While each of the foregoing elements are depicted as part of the core network 907, it will be appreciated that any one of these elements may be owned and/or operated by an entity other than the core network operator.

The MME 962 may be connected to each of the eNode-Bs 960a, 960b, 960c in the RAN 904 via an Si interface and may serve as a control node. For example, the MME 962 may be responsible for authenticating users of the WTRUs 902a, 902b, 902c, bearer activation/deactivation, selecting a particular serving gateway during an initial attach of the WTRUs 902a, 902b, 902c, and the like. The MME 962 may also provide a control plane function for switching between the RAN 904 and other RANs (not shown) that employ other radio technologies, such as GSM or WCDMA.

The serving gateway 964 may be connected to each of the eNode-Bs 960a, 960b, 960c in the RAN 904 via the Si interface. The serving gateway 964 may generally route and forward user data packets to/from the WTRUs 902a, 902b, 902c. The serving gateway 964 may also perform other functions, such as anchoring user planes during inter-eNode B handovers, triggering paging when downlink data is available for the WTRUs 902a, 902b, 902c, managing and storing contexts of the WTRUs 902a, 902b, 902c, and the like.

The serving gateway 964 may also be connected to the PDN gateway 966, which may provide the WTRUs 902a, 902b, 902c with access to packet-switched networks, such as the Internet 910, to facilitate communications between the WTRUs 902a, 902b, 902c and IP-enabled devices.

The core network 907 may facilitate communications with other networks. For example, the core network 907 may provide the WTRUs 902a, 902b, 902c with access to circuit-switched networks, such as the PSTN 908, to facilitate communications between the WTRUs 902a, 902b, 902c and traditional land-line communications devices. For example, the core network 907 may include, or may communicate with, an IP gateway (e.g., an IP multimedia subsystem (IMS) server) that serves as an interface between the core network 907 and the PSTN 908. In addition, the core network 907 may provide the WTRUs 902a, 902b, 902c with access to the networks 912, which may include other wired or wireless networks that are owned and/or operated by other service providers.

Figure 9E:
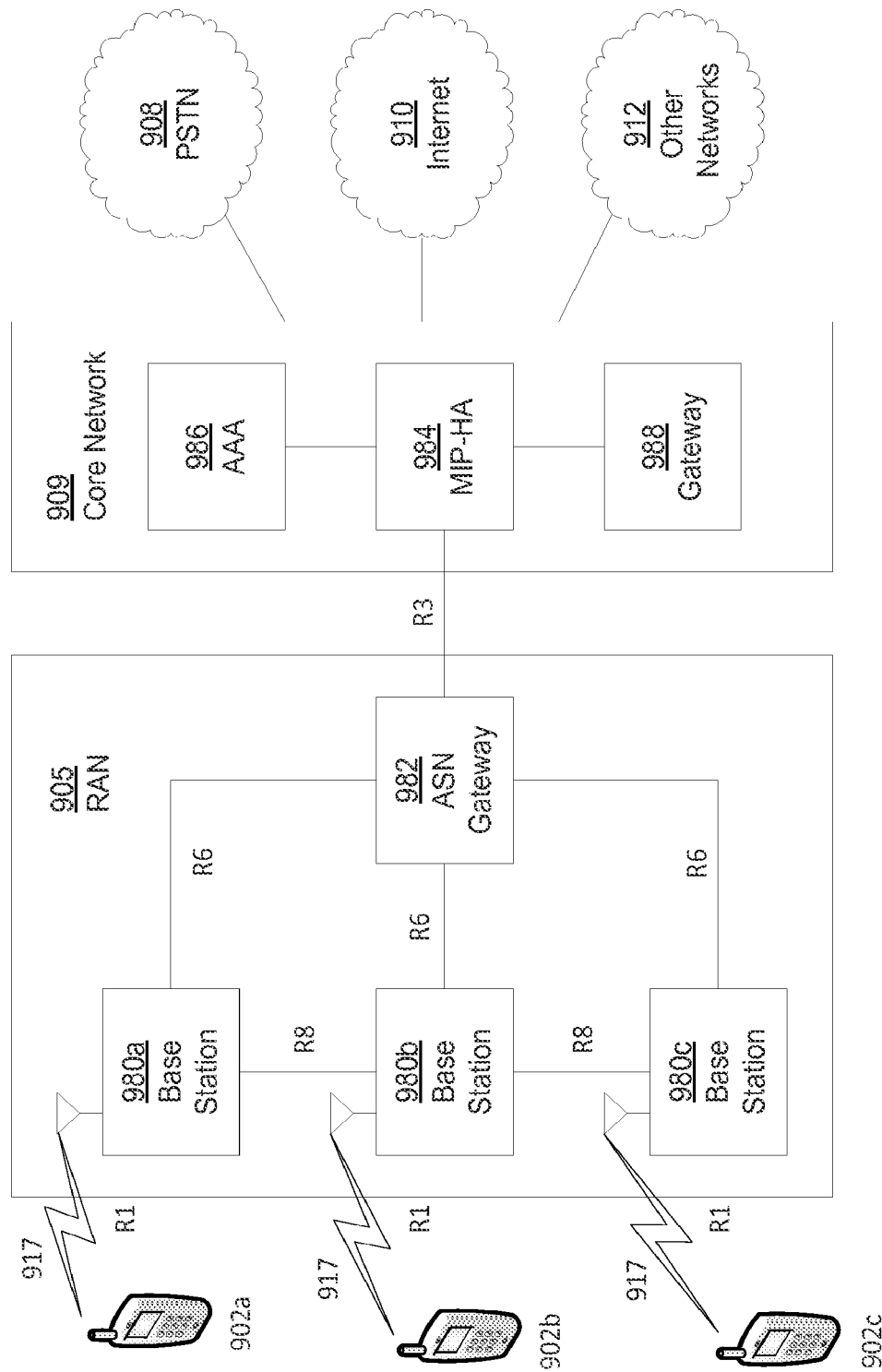
FIG. 9E is a system diagram of an example radio access network and an example core network that may be used within the communications system illustrated in FIG. 9A.

FIG. 9E is a system diagram of the RAN 905 and the core network 909 according to an embodiment. The RAN 905 may be an access service network (ASN) that employs IEEE 802.16 radio technology to communicate with the WTRUs 902a, 902b, 902c over the air interface 917. As will be further discussed below, the communication links between the different functional entities of the WTRUs 902a, 902b, 902c, the RAN 905, and the core network 909 may be defined as reference points.

As shown in FIG. 9E, the RAN 905 may include base stations 980a, 980b, 980c, and an ASN gateway 982, though it will be appreciated that the RAN 905 may include any number of base stations and ASN gateways while remaining consistent with an embodiment. The base stations 980a, 980b, 980c may each be associated with a particular cell (not shown) in the RAN 905 and may each include one or more transceivers for communicating with the WTRUs 902a, 902b, 902c over the air interface 917. In one embodiment, the base stations 980a, 980b, 980c may implement MIMO technology. Thus, the base station 980a, for example, may use multiple antennas to transmit wireless signals to, and receive wireless signals from, the WTRU 902a. The base stations 980a, 980b, 980c may also provide mobility management functions, such as handoff triggering, tunnel establishment, radio resource management, traffic classification, quality of service (QoS) policy enforcement, and the like.

The ASN gateway 982 may serve as a traffic aggregation point and may be responsible for paging, caching of subscriber profiles, routing to the core network 909, and the like.

The air interface 917 between the WTRUs 902a, 902b, 902c and the RAN 905 may be defined as an R1 reference point that implements the IEEE 802.16 specification. In addition, each of the WTRUs 902a, 902b, 902c may establish a logical interface (not shown) with the core network 909. The logical interface between the WTRUs 902a, 902b, 902c and the core network 909 may be defined as an R2 reference point, which may be used for authentication, authorization, IP host configuration management, and/or mobility management.

The communication link between each of the base stations 980a, 980b, 980c may be defined as an R8 reference point that includes protocols for facilitating WTRU handovers and the transfer of data between base stations. The communication link between the base stations 980a, 980b, 980c and the ASN gateway 982 may be defined as an R6 reference point. The R6 reference point may include protocols for facilitating mobility management based on mobility events associated with each of the WTRUs 902a, 902b, 902c.

As shown in FIG. 9E, the RAN 905 may be connected to the core network 909. The communication link between the RAN 905 and the core network 909 may defined as an R3 reference point that includes protocols for facilitating data transfer and mobility management capabilities, for example. The core network 909 may include a mobile IP home agent (MIP-HA) 984, an authentication, authorization, accounting (AAA) server 986, and a gateway 988. While each of the foregoing elements are depicted as part of the core network 909, it will be appreciated that any one of these elements may be owned and/or operated by an entity other than the core network operator.

The MIP-HA may be responsible for IP address management, and may enable the WTRUs 902a, 902b, 902c to roam between different ASNs and/or different core networks. The MIP-HA 984 may provide the WTRUs 902a, 902b, 902c with access to packet-switched networks, such as the Internet 910, to facilitate communications between the WTRUs 902a, 902b, 902c and IP-enabled devices. The AAA server 986 may be responsible for user authentication and for supporting user services. The gateway 988 may facilitate interworking with other networks. For example, the gateway 988 may provide the WTRUs 902a, 902b, 902c with access to circuit-switched networks, such as the PSTN 908, to facilitate communications between the WTRUs 902a, 902b, 902c and traditional land-line communications devices. In addition, the gateway 988 may provide the WTRUs 902a, 902b, 902c with access to the networks 912, which may include other wired or wireless networks that are owned and/or operated by other service providers.

Although not shown in FIG. 9E, it will be appreciated that the RAN 905 may be connected to other ASNs and the core network 909 may be connected to other core networks. The communication link between the RAN 905 the other ASNs may be defined as an R4 reference point, which may include protocols for coordinating the mobility of the WTRUs 902a, 902b, 902c between the RAN 905 and the other ASNs. The communication link between the core network 909 and the other core networks may be defined as an R5 reference, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A multiband device, comprising:
a memory; and
a processor configured to:
receive a request via a first frequency band, wherein the request is associated with scheduling a transmission on a second frequency band, and wherein the request indicates a channel, an allocation start time, and a duration of the transmission on the second frequency band, and wherein the request comprises a sector sweep (SSW) field;
transmit a frame via the first frequency band, wherein the transmitted frame indicates an acceptance of the request, and wherein the transmitted frame comprises a SSW feedback field; and
receive the transmission on the second frequency band in accordance with the allocation start time and the duration, wherein the transmission comprises a beamforming training transmission.

2. The multiband device of claim 1, wherein the request comprises a request to send frame, and the transmitted frame comprises a clear to send frame.

3. The multiband device of claim 1, wherein the processor is further configured to:
transmit a beamforming training schedule.

4. The multiband device of claim 1, wherein the beamforming training transmission comprises a plurality of beamforming training signals.

5. The multiband device of claim 1, wherein the frame comprises a field that indicates whether the request is accepted.

6. The multiband device of claim 1, wherein the transmitted frame does not comprise a media access control (MAC) body.

7. The multiband device of claim 1, wherein the first frequency band is associated with a quasi-omni transmission and the second frequency band is associated with a directional transmission.

8. The multiband device of claim 1, wherein the first frequency band is a 5 GHz band and the second frequency band is a 60 GHz band.

9. A method comprising:
receiving a request via a first frequency band, wherein the request is associated with scheduling a transmission on a second frequency band, and wherein the request indicates a channel, an allocation start time, and a duration of the transmission on the second frequency band, and wherein the request comprises a sector sweep (SSW) field;

transmitting a frame via the first frequency band, wherein the transmitted frame indicates an acceptance of the request, and wherein the transmitted frame comprises a SSW feedback field; and receiving the transmission on the second frequency band in accordance with the allocation start time and the duration, wherein the transmission comprises a beamforming training transmission.

10. The method of claim 9, wherein the request comprises a request to send frame, and the transmitted frame comprises a clear to send frame.

11. The method of claim 9, further comprising: transmitting a beamforming training schedule.

12. The method of claim 9, wherein the beamforming training transmission comprises a plurality of beamforming training signals.

13. The method of claim 9, wherein the frame comprises a field that indicates whether the request is accepted.

14. The method of claim 9, wherein the transmitted frame does not comprise a media access control (MAC) body.

15. The method of claim 9, wherein the first frequency band is associated with a quasi-omni transmission and the second frequency band is associated with a directional transmission.

16. The method of claim 9, wherein the first frequency band is a 5 GHz band and the second frequency band is a 60 GHz band.

17. A multiband device, comprising:
a memory; and
a processor configured to:
 receive a request via a first frequency band, wherein the request is associated with scheduling a transmission on a second frequency band, and wherein the request includes a channel identification, a band identification, an indication of a start time of the transmission on the second frequency band, and an indication of a duration of the transmission on the second frequency band;
 transmit a frame via the first frequency band, wherein the transmitted frame indicates an acceptance of the request; and
 receive the transmission on the second frequency band based on the start time and the duration.

18. The multiband device of claim 17, wherein the request comprises a request to send frame, and the transmitted frame comprises a clear to send frame.

19. The multiband device of claim 17, wherein the processor is further configured to:
transmit a beamforming training schedule.

20. The multiband device of claim 17, wherein the transmission comprises a beamforming training transmission.

\* \* \* \* \*